(12) United States Patent
Liu et al.

(10) Patent No.: US 11,272,396 B2
(45) Date of Patent: Mar. 8, 2022

(54) FRAME AGGREGATION METHOD, NETWORK SETTING FRAME SENDING METHOD, AND DEVICE

(71) Applicant: HUAWEI TECHNOLOGIES CO., LTD., Guangdong (CN)

(72) Inventors: Bing Liu, Beijing (CN); Mingui Zhang, Boulogne Billancourt (FR); Yuefeng Wu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/885,645

(22) Filed: May 28, 2020

(65) Prior Publication Data

US 2020/0296624 A1    Sep. 17, 2020

Related U.S. Application Data

(63) Continuation of application No. PCT/CN2018/088091, filed on May 23, 2018.

(30) Foreign Application Priority Data

Nov. 29, 2017  (CN) .......................... 201711221134.6

(51) Int. Cl.
*H04W 28/06* (2009.01)
*H04L 69/22* (2022.01)
(Continued)

(52) U.S. Cl.
CPC ............. *H04W 28/06* (2013.01); *H04L 69/22* (2013.01); *H04W 80/02* (2013.01); *H04W 84/18* (2013.01)

(58) Field of Classification Search
CPC .............. H04L 47/365; H04L 12/2823; H04L 2012/2841; H04L 29/12; H04L 5/00;
(Continued)

(56) References Cited

U.S. PATENT DOCUMENTS 6,791,949 B1    9/2004  Ryu et al.
9,674,860 B2    6/2017  Park et al.
(Continued)

FOREIGN PATENT DOCUMENTS

CN    101326775 A    12/2008
CN    101741918 A    6/2010
(Continued)

OTHER PUBLICATIONS

Extended European Search Report in corresponding European Application No. 18 88 2551 dated Feb. 26, 2021.
(Continued)

*Primary Examiner* — Kan Yuen

(57) ABSTRACT

This application describes a frame aggregation method. A first forwarding node device receives a first data frame and a second data frame, where the first data frame includes a first MAC header and a first MSDU, the second data frame includes a second MAC header and a second MSDU, and a destination MAC address in the first MAC header is the same as a destination MAC address in the second MAC header; and generates a first aggregated frame, where the first aggregated frame includes an aggregated MAC header and an aggregated MSDU, the aggregated MSDU includes a first sub-MSDU and a second sub-MSDU, the first sub-MSDU includes the first MSDU and a source MAC address of the first data frame, and the second sub-MSDU includes the second MSDU and a source MAC address of the second data frame. A second forwarding node device sends the first aggregated frame.

9 Claims, 18 Drawing Sheets

(51) Int. Cl.
*H04W 80/02* (2009.01)
*H04W 84/18* (2009.01)

(58) Field of Classification Search
CPC .... H04L 69/22; H04W 28/06; H04W 28/065; H04W 40/20; H04W 4/70; H04W 80/02; H04W 84/18
See application file for complete search history.

(56) References Cited

U.S. PATENT DOCUMENTS

| | | | |
|---|---|---|---|
| 2006/0056443 A1* | 3/2006 | Tao | H04W 28/06 370/462 |
| 2007/0104162 A1* | 5/2007 | Kneckt | H04W 72/1221 370/338 |
| 2008/0130538 A1 | 6/2008 | Raissinia et al. | |
| 2009/0060009 A1 | 3/2009 | Qian et al. | |
| 2013/0064229 A1 | 3/2013 | Gidlund et al. | |
| 2013/0195001 A1* | 8/2013 | Liu | H04L 69/22 370/312 |
| 2015/0124704 A1* | 5/2015 | Asterjadhi | H04W 52/0216 370/328 |
| 2016/0006842 A1* | 1/2016 | Tahir | H04L 69/03 370/470 |
| 2016/0294515 A1 | 10/2016 | Wentink et al. | |
| 2018/0054758 A1 | 2/2018 | Meng et al. | |

FOREIGN PATENT DOCUMENTS

| | | |
|---|---|---|
| CN | 101911601 A | 12/2010 |
| CN | 106664604 A | 5/2017 |
| CN | 107258102 A | 10/2017 |
| CN | 107409015 A | 11/2017 |
| JP | 2008512927 A | 4/2008 |
| JP | 2009516408 A | 4/2009 |
| JP | 2013090333 A | 5/2013 |
| JP | 2014027449 A | 2/2014 |
| JP | 2017103527 A | 6/2017 |
| WO | 2017100394 A1 | 6/2017 |

OTHER PUBLICATIONS

Supplementary Partial European Search Report in related European Application No. EP 18 88 2551 dated Nov. 10, 2020.
IEEE Draft P802.11-REVmb/D12, Nov. 2011, Part 11: Wireless LAN Medium Access Control (MAC) and Physical Layer (PHY) Specifications, total 2910 pages.
IEEE Std 802.15. Apr. 2011, IEEE Standard for Low-Rate Wireless Personal Area Networks (WPANs), total 702 pages.
IEEE Std 802.15.4g, Apr. 27, 2012, Part 15.4: Low-Rate Wireless Personal Area Networks (LR-WPANs), Amendment 3: Physical Layer (PHY) Specifications for Low-Data-Rate, Wireless, Smart Metering Utility Networks, total 252 pages.
Thidarut Junjalearnvong et al., A Dynamic Routing Protocol Supporting Mobile Nodes in Wi-SUN FUN Systems, The 20th International Symposium on Wireless Personal Multimedia Communications (WPMC2017), 7 pages.
Notice of Reasons for Rejection dated Jul. 6, 2021 for Japanese Application No. 2020-528292, 6 pages.

* cited by examiner

| Six bytes | Two bytes | One byte | Eight bytes | Eight bytes | Six bytes | At least two bytes | At least 12 bytes | Variable | Four bytes |
|---|---|---|---|---|---|---|---|---|---|
| PHY header (physical layer header) | Frame control (frame control) | Sequence number (sequence number) | Destination MAC address (destination MAC address) | Source MAC address (source MAC address) | AUX security header (auxiliary security header) | Header IEs (header information element) | Payload IEs (payload information element) | Frame payload (frame payload data) | FCS (frame check sequence) |
| | MAC header (MAC header) | | | | | | MSDU (MAC layer service data unit) | | |

FIG. 2

| Two bytes | | Eight bytes | Variable | Two bytes |
|---|---|---|---|---|
| Bits (bits): 0 to 10 Length (length) | Bits (bits): 0 to 14 Group ID (group identifier) | Sample time IE (sample time information element) | Other payload IEs (other payload information elements) | Payload term IE (payload termination information element) |
| | Bits (bits): 15 Type (type) = 1 | | | |
| Payload IEs (payload information element) | | | | |

FIG. 3

| Two bytes | | | Six bytes |
|---|---|---|---|
| Bits (bits): 0 to 7 Length (length) | Bits (bits): 8 to 14 Sub-ID (sub-ID) = 0X09 | Bits (bits): 15 Type (type) = 0 | Sample time (sample time) |

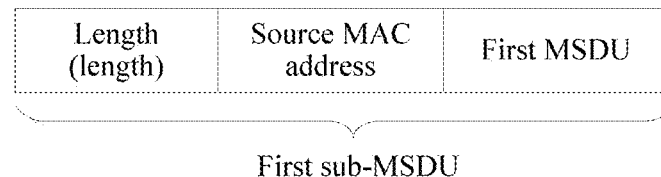

| Length (length) | Source MAC address | First MSDU |

First sub-MSDU

FIG. 9

| Two bytes | | Eight bytes | At least four bytes | Variable |
|---|---|---|---|---|
| Bits (bits): 0 to 5 Reserved | Bits (bits): 6 to 15 Length (length) | Source MAC address (source MAC address) | Payload IEs no sample time IE (payload information element that does not include a sample time information element) | Frame payload (frame payload data, namely, a first MSDU) |

FIG. 10

| Six bytes | At least 27 bytes | Eight bytes | Variable | Two bytes | Variable | Variable | ... | Variable | Four bytes |
|---|---|---|---|---|---|---|---|---|---|
| PHY header (physical layer header) | MAC layer header | Sample time IE (sample time information element) | Other payload IEs (other payload information elements) | Payload term IE (payload termination information element) | Sub-MSDU-1 | Sub-MSDU-2 | ... | Sub-MSDU-N | FCS |

FIG. 13

| Two bytes | Two bytes | Eight bytes | Six bytes | Variable | Variable | Four bytes |
|---|---|---|---|---|---|---|
| Frame control (frame control) | PAN ID (personal area network identifier) | Source MAC address (source MAC address) | AUX security header (auxiliary security header) | Header IEs (header information element) | Payload IEs (payload information element) | FCS (frame check sequence) |
| MAC header (MAC header) | | | | | MAC Payload (MAC layer payload) | |

FIG. 14

| Two bytes | | | Four bytes | 11 bytes |
|---|---|---|---|---|
| Bits (bits): 0 to 10 Length (length) | Bits (bits): 11 to 14 Group ID (group ID) = 0X04 | Bits (bits): 15 Type (type) = 1 | PAN version IE (version number information element) | FAGG IE (frame aggregation information element) |

FIG. 15

| Two bytes | | | Two bytes |
|---|---|---|---|
| Bits (bits): 0 to 7 Length (length) | Bits (bits): 8 to 14 Sub-ID (sub-ID) = 0X06 | Bits (bits): 15 Type (type) = 0 | PAN version (version number) |

FIG. 16

| Two bytes | | Six bytes | Six bytes | Six bytes | Six bytes | Six bytes |
|---|---|---|---|---|---|---|
| Bits (bits): 0 to 7 Length (length) | Bits (bits): 8 to 14 Sub-ID (sub-ID) = 0X08 / Bits (bits): 15 Type (type) = 0 | Timestamp (network setting timestamp) | Sample period (sample period) | Sample offset (sample time advance) | Hops (cluster hop count) | Gradient (deadline gradient) |

FIG. 17

FRAME AGGREGATION METHOD, NETWORK SETTING FRAME SENDING METHOD, AND DEVICE

CROSS-REFERENCE TO RELATED APPLICATIONS

This application is a continuation of International Application No. PCT/CN2018/088091, filed on May 23, 2018, which claims priority to Chinese Patent Application No. 201711221134.6, filed on Nov. 29, 2017. The disclosures of the aforementioned applications are hereby incorporated by reference in their entireties.

TECHNICAL FIELD

This application relates to the field of communications technologies, and in particular, to frame aggregation, and network setting.

BACKGROUND

The Wireless Smart Ubiquitous Network (Wi-SUN) Alliance proposes a low-power and wide-area wireless communications technology, namely, a field area network (FAN) technology, that can be applied to fields, such as, smart metering, smart city, smart grid, smart farming, asset management, and the like.

In an application scenario of data collection such as smart metering or environment monitoring or another application scenario, the Wi-SUN FAN can be networked in a cluster tree topology. Nodes that meet a preset condition (for example, nodes that are close to each other) may form a cluster, and nodes in a same cluster have a same address prefix. Nodes in the Wi-SUN FAN may be classified into a leaf node device, an intermediate forwarding node device, and a cluster head forwarding node device. The cluster head forwarding node device may also be referred to as an aggregation node. Specifically, the leaf node device, for example, a smart meter or an environment monitoring device, may receive a packet and send a packet, but cannot forward a packet. The intermediate forwarding node device may provide a bidirectional packet forwarding function, and may further have all functions of the leaf node device. There is only one cluster head forwarding node device in a cluster, and the cluster head forwarding node device may be a unique data uplink channel in the cluster, and may further have all functions of the intermediate forwarding node device.

The leaf node device forms a data frame after collecting data, and reports the data frame to the cluster head forwarding node device, or reports the data frame to the cluster head forwarding node device by using the intermediate forwarding node device. The cluster head forwarding node device reports the data frame to a router through a path to the router. The intermediate forwarding node device or the cluster head forwarding node device may also report a data frame. In addition to the collected data, a physical layer (PHY) header, a media access control (MAC) header, a frame check sequence (FCS), and the like may be added to the reported data frame, and consequently protocol overheads are relatively high, and resource usage is relatively low. In addition, in a carrier sense multiple access with collision avoidance (CSMA/CA) sending manner, channel contention needs to be performed each time before the data frame is sent. Therefore, when a relatively large number of nodes report data frames, a relatively large quantity of channel contentions are performed, which may cause relatively low channel resource usage and reduce system throughput.

SUMMARY

This application provides a frame aggregation method, a network setting frame sending method, and a device, to aggregate data frames, thereby helping increase channel resource usage and improve system performance.

According to a first aspect, an embodiment of this application provides a frame aggregation method that may be applied to a Wi-SUN FAN.

The frame aggregation method includes a first forwarding node device receives a first data frame sent by a first node device and a second data frame sent by a second node device, where the first data frame includes a first MAC header and a first MSDU, and the second data frame includes a second MAC header and a second MSDU. The first forwarding node device determines that a destination MAC address in the first MAC header is the same as a destination MAC address in the second MAC header, and generates a first aggregated frame based on the first data frame and the second data frame, where the first aggregated frame includes a first aggregated MAC header and a first aggregated MSDU, a destination MAC address in the first aggregated MAC header is the same as the destination MAC address in the first MAC header or the destination MAC address in the second MAC header, the first aggregated MSDU includes a first sub-MSDU and a second sub-MSDU, the first sub-MSDU includes the first MSDU and a source MAC address in the first MAC header, and the second sub-MSDU includes the second MSDU and a source MAC address in the second MAC header. The first forwarding node device sends the first aggregated frame to a second forwarding node device.

According to the foregoing method, the first forwarding node device may aggregate received data frames that have a same destination MAC address, thereby helping reduce packet overheads and a quantity of channel contentions.

In a possible implementation, the first node device, the second node device, and the first forwarding node device may belong to a first cluster, and the first cluster is included in the Wi-SUN FAN. The first node device may be a leaf node device or an intermediate forwarding node device, and if the first node device is the intermediate forwarding node device, the first data frame may be a data frame that is not aggregated, or may be an aggregated frame. The second node device may also be a leaf node device or an intermediate forwarding node device, and if the second node device is the intermediate forwarding node device, the second data frame may be a data frame that is not aggregated, or may be an aggregated frame.

According to the foregoing method, the first forwarding node device may aggregate data frames that are not aggregated or aggregated frames that are sent by a leaf node device or an intermediate forwarding node device in a cluster to which the first forwarding node device belongs, for example, the first forwarding node device may aggregate data frames that are sent by two leaf node devices, or may aggregate frames that are sent by two intermediate forwarding node devices, or may aggregate frames that are sent by the leaf node device and the intermediate forwarding node device. Specifically, the first forwarding node device may aggregate two data frames that are not aggregated, or may aggregate two aggregated frames again, or may aggregate a data frame that is not aggregated and an aggregated frame.

In a possible implementation, the first forwarding node device and the second node device may belong to a first cluster, but the first node device is a cluster head forwarding node device in a second cluster. The corresponding first data frame is an aggregated frame, and the first cluster and the second cluster are different clusters, but are included in the Wi-SUN FAN.

According to the foregoing method, the first forwarding node device may aggregate a data frame that is sent by a node device in a cluster to which the first forwarding node device belongs and an aggregated frame sent by a cluster head node in another cluster. Optionally, the second node device may be the leaf node device or the intermediate forwarding node device.

In a possible implementation, the first forwarding node device is an intermediate forwarding node device, the second forwarding node device is a cluster head forwarding node device or an intermediate forwarding node device, the first forwarding node device and the second forwarding node device belong to a same cluster.

In a possible implementation, the first forwarding node device and the second forwarding node device belong to different clusters, the first forwarding node device is a cluster head forwarding node device, the second forwarding node device is an intermediate forwarding node device or a cluster head forwarding node device, and both the first forwarding node device and the second forwarding node device belong to the Wi-SUN FAN.

According to the foregoing method, the first forwarding node device may be the cluster head forwarding node device, and sends the generated aggregated frame to an intermediate forwarding node device or a cluster head forwarding node device in a previous hop. Optionally, the second forwarding node device may further aggregate the first aggregated frame sent by the first forwarding node device and a data frame sent by another node device in a cluster in which the second forwarding node device is located.

In a possible implementation, the first forwarding node device is a cluster head forwarding node device, the second forwarding node device is a border router, and the border router is not included in the Wi-SUN FAN.

In a possible implementation, the first forwarding node device is a cluster head forwarding node device. The first forwarding node device may further receive a network setting frame from a border router, where the network setting frame is used to indicate a time at which the first forwarding node device reports the first aggregated frame and a time at which each of the first node device and the second node device collects data. The first forwarding node device determines, based on the network setting frame, a deadline for reporting the first aggregated frame; and sends the first aggregated frame to the second forwarding node device based on the deadline.

It should be understood that the foregoing network setting frame from the border router is generated by the border router, but is not necessarily directly sent by the border router to the first forwarding node device. For example, the border router sends the network setting frame to a cluster head forwarding node device connected to the border router, and the cluster head forwarding node device sends the network setting frame to a leaf node device, an intermediate forwarding node device, or a cluster head forwarding node device in another cluster that is connected to the cluster head forwarding node device.

According to the method, the first forwarding node device determines, based on the network setting frame, the deadline for sending the first aggregated frame, thereby helping ensure time validity of data, and avoid a case in which the first forwarding node device cannot upload data that is collected by each node device to an upper-layer application in a timely manner due to a long-time wait for receiving the data frame.

In a possible implementation, the network setting frame may include a network setting timestamp, a cluster hop count, and a sample period, the network setting timestamp is used to determine a reference time of the sample period, the cluster hop count represents a hop count to a cluster in which a destination node device is located from the border router that sends the network setting frame, and the sample period is used to instruct the first node device and the second node device to collect data based on the sample period. Specifically, the first forwarding node device may obtain a first time based on the network setting timestamp and the sample period; remove deadline gradients whose quantity is the cluster hop count from the first time, to obtain the deadline, where the deadline gradient is used to indicate a time required by the first forwarding node device to send the first aggregated frame to a forwarding node device outside the cluster in which the first forwarding node device is located; and increase the cluster hop count in the network setting frame by 1.

In another possible implementation, the first forwarding node device may alternatively first increase the cluster hop by 1, and then obtain the deadline according to the foregoing method.

Optionally, the deadline gradient may be added to the network setting frame and sent to the first forwarding node device, or the deadline gradient may be preconfigured for the first forwarding node device.

In a possible implementation, both the first sub-MSDU and the second sub-MSDU include a length field that is used to indicate a length of a sub-MSDU. Because the first aggregated MSDU in the first aggregated frame may include a plurality of sub-MSDUs, a length of each sub-MSDU is indicated by using the length field, so that another device can distinguish between a previous sub-MSDU and a current sub-MSDU when parsing the aggregated frame.

According to a second aspect, an embodiment of this application provides a network setting frame sending method, including:

A border router obtains a network setting parameter, where the network setting parameter includes a sample period, and the sample period is used to instruct a node device to collect data based on the sample period. The border router generates a network setting frame based on the network setting parameter, where the network setting frame includes a network setting timestamp, a cluster hop count, and the sample period, the network setting timestamp is used to determine a reference time of the sample period, and the cluster hop count represents a hop count to a cluster in which a destination node device is located from the border router that sends the network setting frame. The border router sends the network setting frame to a cluster head forwarding node device, where the cluster head forwarding node device is located in a first cluster in a Wi-SUN FAN, and the first cluster communicates with the border router by using the cluster head forwarding node device.

According to the foregoing method, the border router generates the network setting frame based on the obtained network setting parameter, and sends the network setting frame to each node device in the Wi-SUN FAN by using the cluster head forwarding node device connected to the border router, so that each node device determines the sample period and collects data based on the sample period. Further, each forwarding node device may further determine, based on a deadline gradient and the network setting frame, a deadline for sending an aggregated frame, to ensure time validity of data collection.

In a possible implementation, the network setting parameter further includes a sample time advance that is used to indicate a sample time of the node device in a sample period; and correspondingly, the network setting frame generated by the border router may further include the sample time advance. The sample time advance is set, so that each node device may determine the sample time based on the sample time advance and the sample period, and further, each node device has a uniform sample time.

In a possible implementation, the border router receives an aggregated frame sent by the cluster head forwarding node device, where the aggregated frame is obtained by aggregating only a first data frame sent by a first node device and a second data frame sent by a second node device, both the first node device and the second node device belong to the Wi-SUN FAN, the first data frame includes a first MAC header and a first MSDU, the second data frame includes a second MAC header and a second MSDU, a destination MAC address in the first MAC header is the same as a destination MAC address in the second MAC header, the aggregated frame includes a first aggregated MAC header and a first aggregated MSDU, a destination MAC address in the first aggregated MAC header is the same as the destination MAC address in the first MAC header or the destination MAC address in the second MAC header, the first aggregated MSDU includes a first sub-MSDU and a second sub-MSDU, the first sub-MSDU includes the first MSDU and a source MAC address in the first MAC header, and the second sub-MSDU includes the second MSDU and a source MAC address in the second MAC header.

According to the foregoing method, the border router may receive the aggregated frame sent by the cluster head forwarding node device. Because the first aggregated frame is obtained by aggregating data frames that have a same destination MAC address, thereby helping reduce packet overheads and a quantity of channel contentions.

According to a third aspect, an embodiment of this application provides a first forwarding node device. The first forwarding node device is applied to a wireless smart ubiquitous network Wi-SUN field area network FAN, the Wi-SUN FAN includes the first forwarding node device, a first node device, and a second node device, and the first forwarding node device has a function of implementing an action of the first forwarding node device in the foregoing frame aggregation method. The function may be implemented by hardware, or may be implemented by hardware executing corresponding software. The hardware or the software includes one or more modules corresponding to the foregoing function.

In a possible implementation, a structure of the first forwarding node device includes a processor and an interface. The processor is configured to support the first forwarding node device in performing corresponding functions in the foregoing method. The interface is configured to support communication between the first forwarding node device and the first node device, the second node device, and a second forwarding node device. The first forwarding node device may further include a memory. The memory is configured to couple to the processor, and the memory stores a program instruction and data that are necessary for the first forwarding node device.

In another possible design, the first forwarding node device includes a processor, a receiver, a transmitter, a random access memory, a read-only memory, and a bus. The processor is coupled to the receiver, the transmitter, the random access memory, and the read-only memory by using the bus. When the first forwarding node device needs to run, a basic input/output system built into the read-only memory or a bootloader in an embedded system is used to boot a system to start, and boot the first forwarding node device to enter a normal running state. After entering the normal running state, the first forwarding node device runs an application program and an operating system in the random access memory, so that the processor performs the method according to any one of the first aspect or the possible implementations of the first aspect.

According to a fourth aspect, a first forwarding node device is provided. The first forwarding node device includes a main control board and an interface board, and may further include a switching board. The first forwarding node device is configured to perform the method according to any one of the first aspect or the possible implementations of the first aspect. Specifically, the first forwarding node device includes a module configured to perform the method according to any one of the first aspect or the possible implementations of the first aspect.

According to a fifth aspect, a first forwarding node device is provided. The first forwarding node device includes a controller and a first forwarding sub-device. The first forwarding sub-device includes an interface board, and may further include a switching board. The first forwarding sub-device is configured to perform a function of the interface board according to the fourth aspect, and may further perform a function of the switching board according to the fourth aspect. The controller includes a receiver, a processor, a transmitter, a random access memory, a read-only memory, and a bus. The processor is coupled to the receiver, the transmitter, the random access memory, and the read-only memory by using the bus. When the controller needs to run, a basic input/output system built into the read-only memory or a bootloader in an embedded system is used to boot a system to start, and boot the controller to enter a normal running state. After entering the normal running state, the controller runs an application program and an operating system in the random access memory, so that the processor performs a function of the main control board according to the fourth aspect.

According to a sixth aspect, an embodiment of this application provides a border router. The border router has a function of implementing an action of the border router in the foregoing network setting frame sending method. The function may be implemented by hardware, or may be implemented by hardware executing corresponding software. The hardware or the software includes one or more modules corresponding to the foregoing function.

In a possible implementation, a structure of the border router includes a processor and an interface. The processor is configured to support the border router in performing a corresponding function in the foregoing method. The interface is configured to support communication between the border router and a cluster head forwarding node device. The border router may further include a memory. The memory is configured to couple to the processor, and the memory stores a program instruction and data that are necessary for the border router.

In another possible design, the border router includes a processor, a receiver, a transmitter, a random access memory, a read-only memory, and a bus. The processor is coupled to the receiver, the transmitter, the random access memory, and the read-only memory by using the bus. When the border router needs to run, a basic input/output system built into the read-only memory or a bootloader in an embedded system is used to boot a system to start, and boot the border router to enter a normal running state. After entering the normal running state, the border router runs an application program and an operating system in the random access memory, so that the processor performs the method according to any one of the second aspect or the possible implementations of the second aspect.

According to a seventh aspect, a border router is provided. The border router includes a main control board and an interface board, and may further include a switching board. The border router is configured to perform the method according to any one of the second aspect or the possible implementations of the second aspect. Specifically, the border router includes a module configured to perform the method according to any one of the second aspect or the possible implementations of the second aspect.

According to an eighth aspect, a border router is provided. The border router includes a controller and a first forwarding sub-device. The first forwarding sub-device includes an interface board, and may further include a switching board. The first forwarding sub-device is configured to perform a function of the interface board according to the seventh aspect, and may further perform a function of the switching board according to the seventh aspect. The controller includes a receiver, a processor, a transmitter, a random access memory, a read-only memory, and a bus. The processor is coupled to the receiver, the transmitter, the random access memory, and the read-only memory by using the bus. When the controller needs to run, a basic input/output system built into the read-only memory or a bootloader in an embedded system is used to boot a system to start, and boot the controller to enter a normal running state. After entering the normal running state, the controller runs an application program and an operating system in the random access memory, so that the processor performs a function of the main control board according to the seventh aspect.

According to a ninth aspect, a Wi-SUN FAN is provided. The Wi-SUN FAN includes the first forwarding node device in any one of the foregoing embodiments.

According to a tenth aspect, a computer-readable storage medium is provided. The computer-readable storage medium stores a computer instruction, and when the instruction is run on a computer, the computer is enabled to perform the method according to the first aspect or the second aspect.

BRIEF DESCRIPTION OF DRAWINGS

FIG. 2 is a schematic structural diagram of a data frame according to an embodiment of this application;

FIG. 3 is a schematic structural diagram of a payload information element in a data frame according to an embodiment of this application;

FIG. 9 is a second schematic structural diagram of a sub-MSDU according to an embodiment of this application;

FIG. 10 is a third schematic structural diagram of a sub-MSDU according to an embodiment of this application;

FIG. 13 is a fifth schematic structural diagram of an aggregated frame according to an embodiment of this application;

FIG. 14 is a schematic structural diagram of a network setting frame according to an embodiment of this application;

FIG. 15 is a schematic structural diagram of a payload information element in a network setting frame according to an embodiment of this application;

FIG. 16 is a schematic structural diagram of a version number information element in a network setting frame according to an embodiment of this application;

FIG. 17 is a schematic structural diagram of a frame aggregation information element in a network setting frame according to an embodiment of this application;

DETAILED DESCRIPTION OF EXAMPLE EMBODIMENTS

To make the objectives, technical solutions, and advantages of this application clearer, the following further describes this application in detail with reference to the accompanying drawings.

Figure 1:
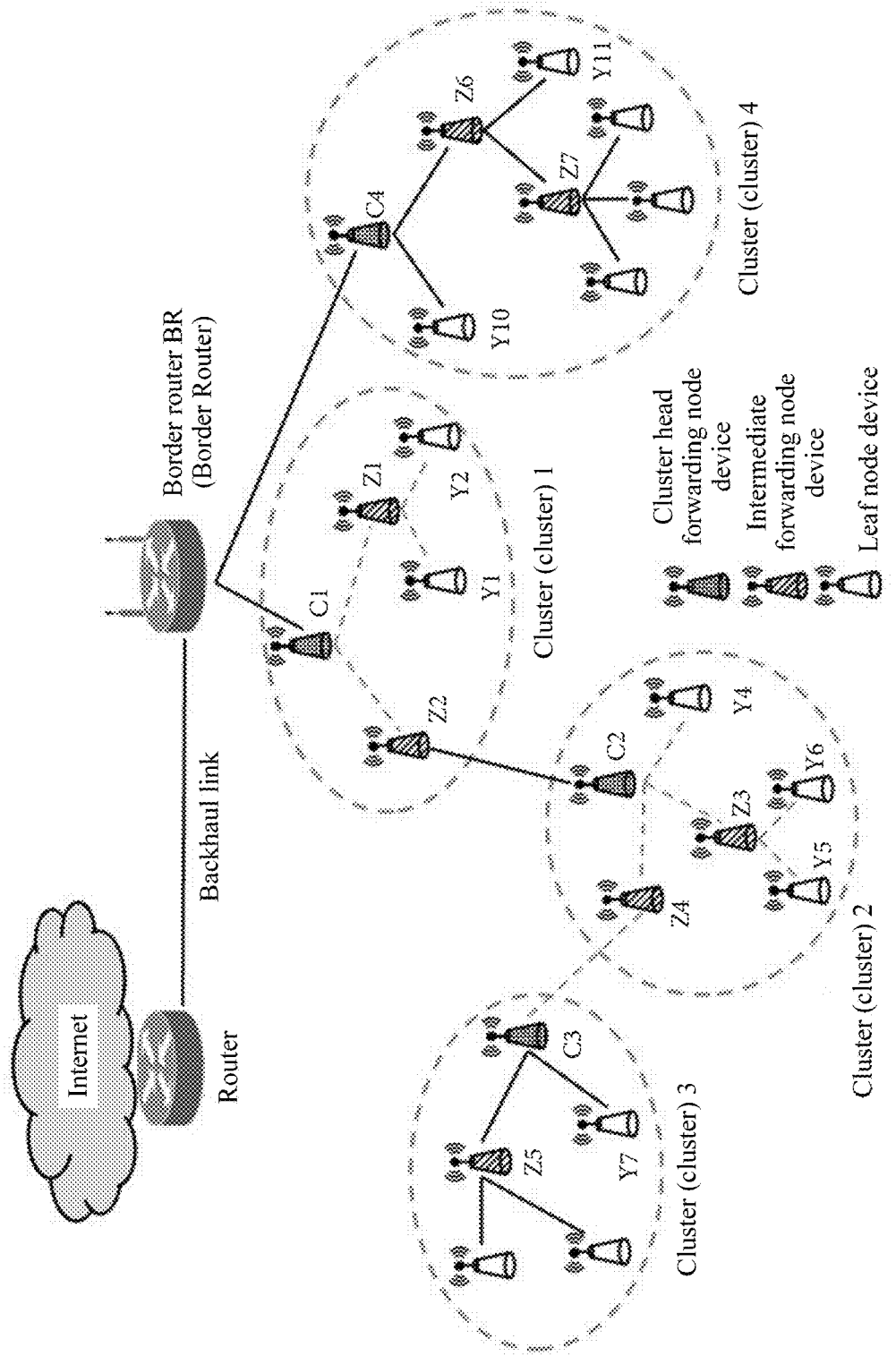
FIG. 1 is a schematic diagram of an application scenario of a Wi-SUN FAN according to an embodiment of this application.

FIG. 1 shows an example of an application scenario of an example Wi-SUN FAN. As shown in the figure, the Wi-SUN FAN includes node devices in a cluster 1, a cluster 2, a cluster 3, and a cluster 4. Although FIG. 1 shows a border router and a router, the border router and the router do not belong to the Wi-SUN FAN in this embodiment of this application. A cluster head forwarding node device in the cluster 2 is connected to an intermediate forwarding node device in the cluster 1, in other words, the cluster 1 is a previous hop of the cluster 2. A cluster head forwarding node device in the cluster 3 is connected to an intermediate forwarding node device in the cluster 2, in other words, the cluster 2 is a previous hop of the cluster 3. Cluster head forwarding node devices in the cluster 1 and the cluster 4 are each directly connected to the border router. A cluster hop count of each of the cluster 1 and the cluster 4 may be set to 1, a cluster hop count of the cluster 2 may be set to 2, and a cluster hop count of the cluster 3 may be set to 3, or, alternatively, a cluster hop count of each of the cluster 1 and the cluster 4 may be set to 0, a cluster hop count of the cluster 2 may be set to 1, and a cluster hop count of the cluster 3 may be set to 2.

A data collection scenario such as smart metering or environment monitoring shown in FIG. 1 is used as an example. A smart water meter, a smart meter, or an environment monitoring device (which may be a leaf node device, an intermediate forwarding node device, or a cluster head forwarding node device) usually needs to periodically report collected data to a network, so that a user can monitor and manage the collected data over the network.

Each node may encapsulate the collected data into a data frame (namely, a data frame before aggregation) shown in FIG. 2, and send the data frame to a previous node.

Specifically, as shown in FIG. 2, a MAC layer header includes a frame control field, a sequence number field, a destination MAC address field, a source MAC address field, an auxiliary security header (AUX security header), and a header information element (header IE). The frame control field is used to provide an information index for parsing a frame. The sequence number field represents a number that is set for the data frame by the node that sends the data frame. The destination MAC address represents a MAC address of a destination device of the data frame. The auxiliary security header is used to indicate a key that is required when the data frame is decrypted, for example, an index value of the key. The header information element is used to indicate a type of the data frame and a time point at which the data frame is sent in a local unicast timeslot.

A MAC layer service data unit (MSDU) includes a payload information element and frame payload data, where the payload information element is used to indicate information such as a length and a type of the MSDU, and the frame payload data includes data collected by a node.

Figures 4, 5:
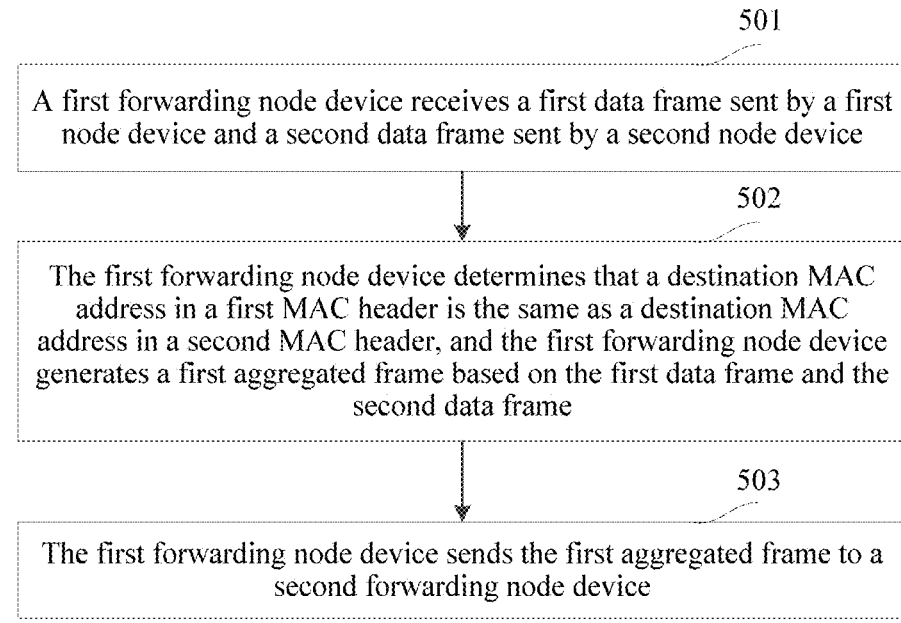
FIG. 4 is a schematic structural diagram of a sample time information element in a data frame according to an embodiment of this application.
FIG. 5 is a schematic flowchart of a frame aggregation method according to an embodiment of this application.

Further, as shown in FIG. 3, the payload information element may include the length of the MSDU, a group identifier, a payload information type, a sample time information element, another payload information element, and a payload termination information element. As shown in FIG. 4, the sample time information element may include a length, an ID, a type, and a sample time.

An FCS field is used to check the data frame. Specifically, a sender performs calculation on the data frame based on a preset algorithm, to obtain a calculation result, and a receiver performs calculation on the data frame by using the same algorithm after receiving the data frame. If a calculation result of the receiver is the same as the received FCS field, it is considered that the received data frame is correct; otherwise, the receiver considers that an error occurs in the data frame, and discards the data frame.

Therefore, each node needs to send the foregoing information by using a large quantity of bytes when sending a data frame. However, when a relatively large quantity of nodes each sends data frames including its collected data, a plurality of channel contentions need to be performed, and consequently channel resource usage and system throughput are affected.

To resolve the foregoing technical problem, an embodiment of this application provides a frame aggregation method, applied to the Wi-SUN FAN, to aggregate data frames, thereby helping increase channel resource usage, reduce a quantity of contentions, and improve system performance.

The frame aggregation method provided in this embodiment of this application may be applied to the Wi-SUN FAN shown in FIG. 1. However, a network structure shown in FIG. 1 constitutes no limitation on this application. It should be understood that a scenario to which this embodiment of this application can be applied may include more or fewer clusters than those shown in FIG. 1. In addition, a cluster head forwarding node device in a next hop may be further connected to a cluster head forwarding node device in a current hop. For example, a cluster head forwarding node device 2 may be connected to a cluster head forwarding node device 1, and a cluster head forwarding node device 3 may be connected to the cluster head forwarding node device 2. This is not limited in this embodiment of this application.

FIG. 5 is a schematic flowchart of a frame aggregation method according to an embodiment of this application. As shown in the figure, the method may include the following steps.

Step 501: A first forwarding node device receives a first data frame sent by a first node device and a second data frame sent by a second node device.

The first data frame includes a first MAC header and a first MSDU, and the second data frame includes a second MAC header and a second MSDU. Formats of the first MAC header and the second MAC header may be shown in FIG. 2, but are not limited to the MAC header shown in FIG. 2, and may include less or more MAC information than that shown in FIG. 2. The MSDU in the data frame includes reported data. For example, if the first node device is a smart meter, current electricity consumption collected by the smart meter is included in the MSDU.

Optionally, the first forwarding node device may be a cluster head forwarding node device, or may be an intermediate forwarding node device, to be specific, both the cluster head forwarding node device and the intermediate forwarding node device may aggregate received data frames by using the frame aggregation method provided in this embodiment of this application.

As shown in FIG. 1, the cluster head forwarding node device may be connected to a leaf node device and an intermediate forwarding node device that are in a cluster in which the cluster head forwarding node device is located, to be specific, may receive data frames sent by the leaf node device and the intermediate forwarding node device in the cluster. Therefore, in the foregoing step, the first data frame received by the first forwarding node device may be the data frame sent by the leaf node device in the cluster, or may be the data frame sent by the intermediate forwarding node device in the cluster, and the second data frame may be the data frame sent by the leaf node device in the cluster, or may be the data frame sent by the intermediate forwarding node device in the cluster.

For example, as shown in FIG. 1, if a cluster head forwarding node device C1 is used as the first forwarding node device, the cluster head forwarding node device C1 may receive and aggregate data frames sent by an intermediate forwarding node device Z1 and an intermediate forwarding node device Z2 in the cluster 1. If the intermediate forwarding node device Z1 is used as the first forwarding node device, the intermediate forwarding node device Z1 may receive and aggregate data frames sent by a leaf node device Y1 and a leaf node device Y2. If a cluster head forwarding node device C4 is used as the first forwarding node device, the cluster head forwarding node device C4 may receive and aggregate data frames sent by a leaf node device Y10 and an intermediate forwarding node device Z6. If the intermediate forwarding node device Z6 is used as the first forwarding node device, the intermediate forwarding node device Z6 may receive and aggregate data frames sent by a leaf node device Y11 and an intermediate forwarding node device Z7. In addition, although not shown in FIG. 1, the cluster head forwarding node device may alternatively be connected to a plurality of leaf node devices to receive and aggregate data frames sent by the plurality of leaf node devices, and the intermediate forwarding node device may alternatively be connected to a plurality of intermediate forwarding node devices to receive and aggregate data frames sent by the plurality of intermediate forwarding node devices.

Further, if the first node device is a leaf node device, the first data frame sent by the first node device is usually a data frame that is not aggregated. If the first node device is an intermediate forwarding node device, for example, an intermediate forwarding node device that belongs to a same cluster as the first forwarding node device, the first data frame sent by the first node device may be a data frame that is not aggregated, or may be an aggregated frame.

For example, if the intermediate forwarding node device cannot aggregate data frames, the intermediate forwarding node device may send, to the first forwarding node device, a data frame that is generated by the intermediate forwarding node device or it may forward, to the first forwarding device, a received data frame that is sent by another node device. If the intermediate forwarding node device does not have an aggregation capability but receives an aggregated frame sent by another node device, the intermediate forwarding node device may also forward the aggregated frame to the first forwarding node device. If the intermediate forwarding node device has the aggregation capability, the intermediate forwarding node device may aggregate a plurality of received data frames and send the obtained aggregated frame to the first forwarding node device.

Similarly, the second node device may be a leaf node device, or may be an intermediate forwarding node device. Correspondingly, the second data frame may be a data frame that is not aggregated, or may be an aggregated frame.

In some embodiments, one of the first node device or the second node device, or both the first node device and the second node device, may belong to a cluster that is different from a cluster to which the first forwarding node device belongs. For example, if the intermediate forwarding node device Z2 in FIG. 1 is used as the first forwarding node device, a leaf node device Y3 (not shown in FIG. 1) connected to the intermediate forwarding node device Z2 may be in the same cluster as the intermediate forwarding node device Z2, but a cluster head forwarding node device C2 connected to the intermediate forwarding node device Z2 may be in a cluster different from the cluster of the intermediate forwarding node device Z2.

When the first node device and the first forwarding node device belong to different clusters, the first node device is usually a cluster head forwarding node device in a next hop, such as, for example, the intermediate forwarding node device Z2 and the cluster head forwarding node device C2 in FIG. 1. Therefore, the first data frame sent by the first node device may be an aggregated frame. Certainly, even if the first node device is the cluster head forwarding node device, the first node device may not have the aggregation function, or may have the aggregation function but may not have a plurality of data frames for aggregation at a moment. In this case, the first node device may send, to the first forwarding node device, a data frame that is not aggregated.

Correspondingly, when the second node device and the first forwarding node device belong to different clusters, the second data frame sent by the second node device may be an aggregated frame, or may be a data frame that is not aggregated.

Step 502: The first forwarding node device determines that a destination MAC address in the first MAC header is the same as a destination MAC address in the second MAC header, and the first forwarding node device generates a first aggregated frame based on the first data frame and the second data frame.

Figure 6:
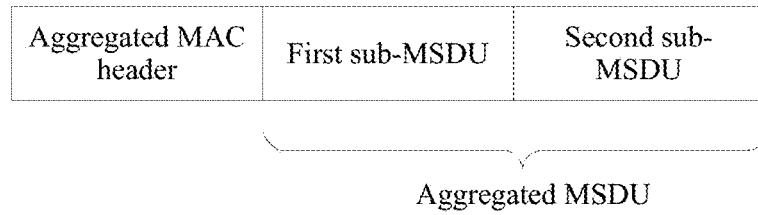
FIG. 6 is a first schematic structural diagram of an aggregated frame according to an embodiment of this application.

Specifically, the generated first aggregated frame includes a first aggregated MAC header and a first aggregated MSDU. A structure of the aggregated frame may be shown in FIG. 6. It should be understood that, although aggregation of two data frames is used as an example in this embodiment of this application, more data frames may be further aggregated according to the frame aggregation method provided in this application, and an MSDU in a generated aggregated frame may further include more sub-MSDUs.

A destination MAC address in the first aggregated MAC header is the same as the destination MAC address in the first MAC header or the destination MAC address in the second MAC header. Because the destination MAC address in the first MAC header in the first data frame is the same as the destination MAC address in the second MAC header in the second data frame, when generating the first aggregated frame, the first forwarding node device may obtain the destination MAC address from the first MAC header to generate the destination MAC address in the first aggregated MAC header in the aggregated frame, or may obtain the destination MAC address from the second MAC header to generate the aggregated frame. Alternatively, in an application scenario, each node sends collected data to a border router, and then the border router sends the data to an upper-layer application. A forwarding node device that has the aggregation function may pre-store a destination MAC address, or pre-store a template of an aggregated frame, where the template includes a destination MAC address. Because an aggregated MAC header of the aggregated frame includes the destination MAC address, each sub-MSDU does not need to include the destination MAC address, to reduce a large quantity of bytes occupied by a plurality of same destination MAC addresses, thereby reducing packet overheads.

Figure 7:
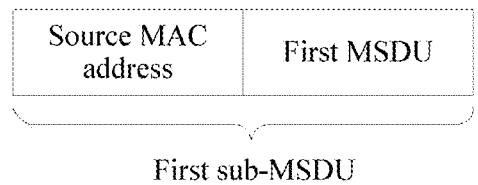
FIG. 7 is a first schematic structural diagram of a sub-MSDU according to an embodiment of this application.

In addition, the first aggregated MSDU includes a first sub-MSDU and a second sub-MSDU. The first sub-MSDU includes the first MSDU in the first data frame and a source MAC address in the first MAC header, as shown in FIG. 7; and the second sub-MSDU includes the second MSDU in the second data frame and a source MAC address in the second MAC header, and a structure is similar to that shown in FIG. 7.

Each sub-MSDU in the aggregated frame retains a source MAC address and an MSDU included in a data frame before aggregation, so that when obtaining data reported by each node, the upper-layer application that receives the aggregated frame can map the data to the node, thereby facilitating data statistics collection, data analysis, and data management.

As described above, the first data frame may be a data frame that is not aggregated, or may be an aggregated frame, and the second data frame may also be a data frame that is not aggregated or an aggregated frame. In a specific embodiment, if the first data frame received by the first forwarding node device is an aggregated frame, and the received second data frame is a data frame that is not aggregated, the first forwarding node device may add, to the first data frame, a sub-MSDU that is generated based on the second data frame, or may regenerate an aggregated MAC header, generate a sub-MSDU based on the first data frame and the second data frame, and aggregate and encapsulate the sub-MSDU into a new aggregated frame.

Figure 8:
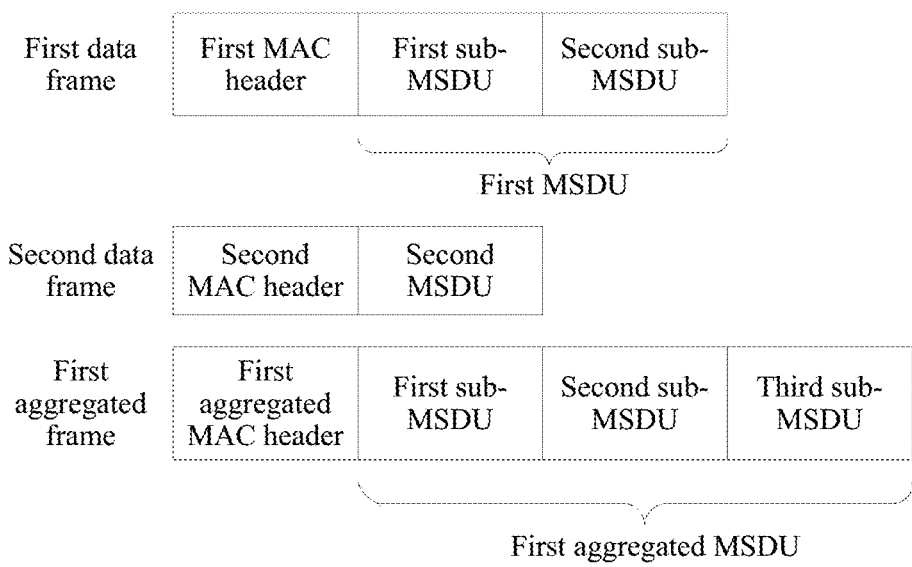
FIG. 8 is a second schematic structural diagram of an aggregated frame according to an embodiment of this application.

For example, as shown in FIG. 8, the first data frame is an aggregated frame, and includes the first MAC header and the first MSDU. The first MSDU further includes the first sub-MSDU and the second sub-MSDU. The second data frame is a data frame that is not aggregated, and includes the second MAC header and the second MSDU. The first aggregated frame that is generated by the first forwarding node device based on the first data frame and the second data frame may be shown in the figure, and includes the first aggregated MAC header and the first aggregated MSDU. The first aggregated MAC header may be consistent with the first MAC header in the first data frame. In some implementations, the first aggregated MAC header may be inconsistent with the first MAC header. For example, if the first aggregated MAC header includes a frame sequence number, the first forwarding node device determines a sequence number in the first aggregated frame based on a status of the data frame sent by the first forwarding node device. For another example, if the first aggregated MAC header includes an auxiliary security header, the first forwarding node device may determine the auxiliary security header based on a key that is used by the first forwarding node device to encrypt the data frame. The first aggregated MSDU includes the first sub-MSDU, the second sub-MSDU, and a third sub-MSDU, where the third sub-MSDU includes the source MAC address in the second MAC header and the second MSDU.

In this embodiment of this application, the first forwarding node device aggregates data frames that have a same destination MAC address, thereby helping reduce packet overheads and a quantity of channel contentions. Especially, when each node device needs to periodically report a data frame, a same sample period is set for each node. In this case, a plurality of node devices report data frames at a same moment or within a relatively short time period, and destination MAC addresses are the same. In other words, the first forwarding node device may aggregate a plurality of data frames by using the frame aggregation method provided in this embodiment of this application, to reduce packet overheads and a quantity of channel contentions.

In a possible implementation, each sub-MSDU in the aggregated frame further includes a length field, as shown in FIG. 9. The length field is used to indicate a length of each sub-MSDU. Because data information reported by all nodes may be different, the lengths of all sub-MSDUs may be different. Therefore, adding the length field to each sub-MSDU facilitates a device that receives the aggregated frame to distinguish between a previous sub-MSDU and a current sub-MSDU.

It should be understood that the length field can facilitate another device to distinguish between a previous sub-MSDU and a current sub-MSDU when the device parses the aggregated frame, but the device may also distinguish between the two sub-MSDUs in another manner, such as, for example, by inserting a separator between the two sub-MSDUs, or by identifying a start position or an end position of a sub-MSDU based on other information.

In addition, each sub-MSDU may further include a sample time of data, to facilitate the upper-layer application to perform statistics collection and management based on the sample time and sampled data, as shown in FIG. 10.

The first sub-MSDU shown in FIG. 10 includes a reserved bit that is used to distinguish between sub-MSDUs. As described above, each sub-MSDU may alternatively have no reserved bit, and a previous sub-MSDU and a current sub-MSDU are distinguished based on other information such as sub-MSDU information.

Figure 11:
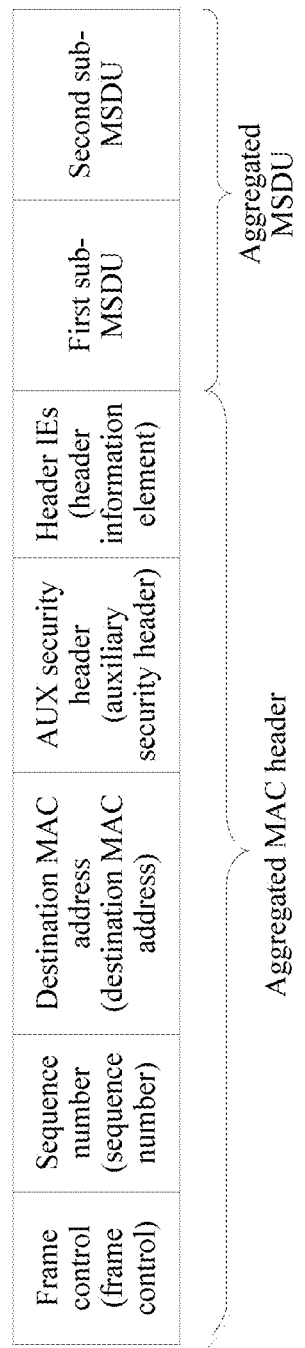
FIG. 11 is a third schematic structural diagram of an aggregated frame according to an embodiment of this application.

In a possible implementation, the aggregated MAC header in the aggregated frame may further include one or any combination of the following information: frame control information, a sequence number, an auxiliary security header, and a header information element. Correspondingly, if the aggregated MAC header includes the foregoing information, the sub-MSDU in the aggregated frame may no longer include the foregoing information, to further reduce packet overheads. In a specific embodiment, a structure of the aggregated frame may be shown in FIG. 11.

Optionally, to facilitate the first forwarding node device to decrypt a received data frame and aggregate and encapsulate information in the data frame into the aggregated frame, each node in the Wi-SUN FAN may use a same encryption method, that is, keys indicated by auxiliary security headers are the same, to simplify a decryption process performed by the first forwarding node device. When generating the aggregated frame based on each received data frame, the first forwarding node device also encrypts the aggregated frame by using an encryption method that is the same as the encryption method of each node device.

Figure 12:
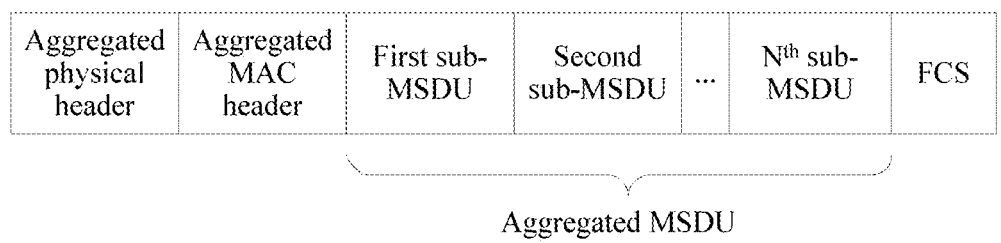
FIG. 12 is a fourth schematic structural diagram of an aggregated frame according to an embodiment of this application.

Further, a physical layer header (PHY header) and/or an FCS may be further added to the aggregated frame. As shown in FIG. 12, correspondingly, each sub-MSDU may no longer retain a physical layer header and an FCS in a source data frame, so that when N data frames are aggregated, byte overheads of N−1 physical layer headers and the FCS can be reduced. Information included in an FCS field may be verification information of an aggregated frame that is generated by performing calculation on the aggregated frame according to a preset method.

Optionally, the first forwarding node device may further aggregate only data frames whose data is collected and sent in a same sample period. In this case, a sample time information element may be further added to the aggregated frame. As shown in FIG. 13, correspondingly, each sub-MSDU may no longer retain the sample time information element, to further reduce byte overheads. As shown in FIG. 13, the aggregated frame may further include another payload information element and a payload termination information element. In this case, each sub-MSDU may no longer retain another payload information element and the payload termination information element, to further reduce byte overheads.

Optionally, the first forwarding node device starts to generate the first aggregated frame after receiving the first data frame and the second data frame, or may generate the first aggregated frame based on the first data frame and the second data frame before an agreed time at which the first forwarding node device reports the data frame. In some scenarios, for example, if a plurality of environment monitoring devices need to periodically report monitoring data, and a destination MAC address of each of these data frames is the border router or another preset address, the first forwarding node device may alternatively start to aggregate and encapsulate the first data frame after receiving the first data frame.

In the foregoing embodiment, that the first forwarding node device generates the aggregated frame based on the first data frame and the second data frame is used as an example. However, according to the frame aggregation method provided in this application, more data frames may be further aggregated, and if more data frames are aggregated, more packet overheads are reduced, and a larger quantity of channel contentions are reduced. However, if more data frames are aggregated, a length of a formed aggregated frame is longer. If the length of the aggregated frame is excessively long, a transmission error may occur. To avoid the transmission error, an upper limit may be set for the length of the aggregated frame. For example, if a frame length that can be supported by a maximum physical layer payload in the Wi-SUN FAN is 2047 bytes, the 2047 bytes may be used as the upper limit of the length of the aggregated frame.

When generating the aggregated data frame based on a plurality of data frames, the first forwarding node device usually sequentially generates, in a receiving time sequence, a sub-MSDU based on each aggregated data frame. Optionally, before generating a sub-MSDU based on a data frame, the first forwarding node device may first determine whether a length of an aggregated frame exceeds a preset upper limit if the first forwarding node device generates the sub-MSDU based on the data frame and aggregates and encapsulates the sub-MSDU into the aggregated frame. If the length of the aggregated frame does not exceed the preset upper limit, the first forwarding node device continues to perform aggregation and encapsulation; otherwise, the first forwarding node device does not continue to aggregate and encapsulate a new sub-MSDU into the aggregated frame, but generates a new aggregated frame based on a data frame that is not yet involved in aggregation and encapsulation.

In some embodiments, the first forwarding node device may also need to report data. In this case, the first forwarding node device may generate the data frame, then generate the sub-MSDU based on the generated data frame, and aggregate and encapsulate the sub-MSDU into the aggregated frame, or the first forwarding node device may generate the sub-MSDU based on the data that needs to be reported, and aggregate and encapsulate the sub-MSDU into the aggregated frame.

Step 503: The first forwarding node device sends the first aggregated frame to a second forwarding node device.

In a possible implementation, the first forwarding node device is an intermediate forwarding node device, and the second forwarding node device may be a cluster head forwarding node device in a cluster in which the first forwarding node device is located. For example, if the intermediate forwarding node device Z1 shown in FIG. 1 is the first forwarding node device, the second forwarding node device is the cluster head forwarding node device C1. Alternatively, the second forwarding node device may be an intermediate forwarding node device in a cluster in which the first forwarding node device is located. For example, if the intermediate forwarding node device Z7 shown in FIG. 1 is the first forwarding node device, the second forwarding node device is the intermediate forwarding node device Z6.

In another possible implementation, the first forwarding node device is a cluster head forwarding node device, the second forwarding node device is an intermediate forwarding node device or a cluster head forwarding node device, and the first forwarding node device and the second forwarding node device belong to different clusters. For example, if the cluster head forwarding node device C2 in the cluster 2 shown in FIG. 1 is the first forwarding node device, the second forwarding node device is the intermediate forwarding node device Z2 in the cluster 1. In addition, although not shown in FIG. 1, the cluster head forwarding node device C2 in the cluster 2 may also be connected to the cluster head forwarding node device C1 in the cluster 1. In this latter case, if the cluster head forwarding node device C2 is the first forwarding node device, the second forwarding node device is the cluster head forwarding node device C1.

In another possible implementation, the first forwarding node device is a cluster head forwarding node device, the second forwarding node device is a border router, and the border router is located outside the Wi-SUN FAN. For example, if the cluster head forwarding node device C1 shown in FIG. 1 is the first forwarding node device, the second forwarding node device is the border router.

When generating the aggregated frame based on a plurality of received data frames, to reduce packet overheads, reduce a quantity of channel contentions, and fully use a channel resource to a great extent, the first forwarding node device may need to wait for a time period, to receive more data frames that can be aggregated and aggregate the data frames. However, to ensure time validity of data, a deadline for sending the aggregated frame may be set for the first forwarding node device, to avoid a case in which the first forwarding node device cannot upload data that is collected by each node device to the upper-layer application in a timely manner due to a long-time wait.

In some embodiments, the first forwarding node device may further receive a network setting frame from the border router, where the network setting frame is used to indicate a time at which the first forwarding node device reports the first aggregated frame and a time at which each of the first node device and the second node device collects data. The network setting frame is generated by the border router, and is delivered layer by layer by using each node device. FIG. 1 is still used as an example. The border router sends the network setting frame to the cluster head forwarding node device C1 and the cluster head forwarding node device C4, the cluster head forwarding node device C1 sends the network setting frame to the routing forwarding node device Z1 and the routing forwarding node device Z2, the routing forwarding node device Z1 forwards the network setting frame to the leaf node device Y1 and the leaf node device Y2, the routing forwarding node device Z2 forwards the network setting frame to the leaf node device Y3 (not shown in FIG. 1) and the cluster head forwarding node device C2, and so on.

The first forwarding node device determines, based on the received network setting frame, a deadline for reporting the first aggregated frame; and sends the first aggregated frame to the second forwarding node device based on the deadline.

Further, the deadline may be set for only the cluster head forwarding node device, and the deadline may not be set for the routing forwarding node device. The deadline may alternatively be set for both the cluster head forwarding node device and the routing forwarding node device.

An example in which the deadline is set for only the cluster head forwarding node device is used below for further description.

In a specific implementation, the network setting frame includes a network setting timestamp $t_c$, a cluster hop count i, and a sample period P.

The sample period P is used to instruct each node device (which may include the leaf node device, the intermediate forwarding node device, and the cluster head forwarding node device) to collect data based on the sample period and report the data. In an application scenario such as smart metering and environment monitoring, each node device collects data once in each sample period and reports the data, and the cluster head forwarding node device and/or the intermediate forwarding node device aggregates data frames in each sample period and reports the aggregated data frame. Usually, sample periods of node devices controlled by one type of application are the same. For example, periods for reporting electricity consumption by smart meters are the same, and periods for reporting an environment parameter by environment monitoring devices are the same.

The network setting timestamp $t_c$ is used to determine a reference time of the sample period, for example, if the sample period is 60 s, $t_c$ to $t_c+60$ s is a first sample period, $t_c+60$ s to $t_c+120$ s is a second sample period, and so on. Optionally, when sending the network setting frame, the border router may use a sending time as the network setting timestamp $t_c$, so that each node device determines the sample period based on the network setting timestamp. When each cluster head forwarding node device forwards the network setting frame to the intermediate forwarding node device or the leaf node device, or when the intermediate forwarding node device forwards the network setting frame to the leaf node device or a next-hop cluster head forwarding node device, the network setting timestamp $t_c$ is not changed, so that each node device has a uniform sample period and sample time.

The cluster hop count i represents a hop count to a cluster in which a destination node device is located from the border router that sends the network setting frame. For example, the network architecture diagram shown in FIG. 1 is used as an example. A cluster hop count of each node device in the cluster 1 and the cluster 4 may be set to 1, a cluster hop count of each node device in the cluster 2 may be set to 2, and a cluster hop count of each node device in the cluster 3 may be set to 3. Alternatively, a cluster hop count of each node device in the cluster 1 and the cluster 4 may be set to 0, a cluster hop count of each node device in the cluster 2 may be set to 1, and a cluster hop count of each node device in the cluster 3 may be set to 2.

The cluster head forwarding node device may obtain a first time based on the network setting timestamp $t_c$ and the sample period P, and remove i deadline gradients ΔD from the first time, to obtain the deadline. The deadline gradient ΔD is used to indicate a time required by the cluster head forwarding node device to send the aggregated frame to a forwarding node device outside the cluster in which the cluster head forwarding node device is located. The network architecture diagram shown in FIG. 1 is still used as an example. If a deadline for sending an aggregated frame by the cluster head forwarding node device C1 is T1, a deadline for sending the aggregated frame by the cluster head forwarding node device C2 is T2=T1−ΔD, and a deadline for sending the aggregated frame by a cluster head forwarding node device C3 is T3=T1−2×ΔD.

Optionally, the deadline gradient ΔD may be included in the network setting frame, or may be preconfigured in the first forwarding node device.

In a specific embodiment, the cluster head forwarding node device may determine, based on a formula (1), a deadline D(i) for sending the aggregated frame by the cluster head forwarding node device:

$$D(i)=t_c+n\times P-i\times \Delta D \qquad (1), \text{where}$$

n represents a sample period sequence number.

Optionally, n may be calculated by the cluster head forwarding node device. Specifically, the cluster head forwarding node device may determine a current sample period sequence number n based on a formula (2):

$$n=\lceil (t-t_c)/P \rceil \qquad (2), \text{where}$$

the symbol ⌈•⌉ represents rounding up, t represents a current time, $t_c$ represents the network setting timestamp, and P represents the sample period.

Certainly, the cluster head forwarding node device may determine the sample period sequence number in another manner. For example, the cluster head forwarding node device may use a parameter that is used to represent a quantity of sample times, and a value of the parameter is increased by 1 each time one sample period elapses. This application sets no limitation on how to determine the sample period sequence number n.

Further, the network setting frame may further include a sample time advance that is used to indicate a sample time of each node device in a sample period. In a specific implementation, after receiving the network setting frame, each node device may determine the sample time based on a formula (3):

$$t_s=t_c+n\times P-\Delta T \qquad (3), \text{where}$$

$t_s$ represents the sample time of the node device, n represents the sample period sequence number, P represents the sample period, ΔT represents the sample time advance, and $t_c$ represents the network setting timestamp. For example, if the sample period is 60 s, the sample time advance is 1 s, and the network setting timestamp is 0. Correspondingly, each node performs sampling at (0+1×60−1)s for the first time, performs sampling at (0+2×60−1)s for the second time, and so on.

A method for determining the value of n by each node is similar to the foregoing method for determining the value of n by the cluster head forwarding node device. Details are not described herein again.

In a specific embodiment, a structure of the network setting frame may be shown in FIG. 14, and includes a MAC layer header, a MAC layer payload, and an FCS. The MAC layer header may further include a frame control field, a personal area network identifier, a source MAC address, a payload security header, and a header information element. Further, a payload information element field in FIG. 14 may specifically include information shown in FIG. 15. A version number information element (PAN version IE) field and a frame aggregation information element (FAGG IE) field may be respectively shown in FIG. 16 and FIG. 17.

In a possible implementation, when the cluster hop count of each node device in the cluster 1 and the cluster 4 is 1, the cluster hop count of each node device in the cluster 2 is 2, and the cluster hop count of each node device in the cluster 3 is 3, an initial value of a cluster hop count in the network setting frame sent by the border router may be 1. When determining the deadline of the cluster head forwarding node device C1 based on the network setting frame sent by the border router, and forwarding the network setting frame to another node device, the cluster head forwarding node device C1 increases the cluster hop count in the network setting frame by 1, so that the cluster head forwarding node device C2 can calculate, based on the modified network setting frame, the deadline corresponding to the cluster head forwarding node device C2. However, for each node device in the cluster 1, because only the sample time may be calculated, and the deadline does not need to be calculated, each node device is not affected when the cluster hop count changes. When forwarding the network setting frame, the cluster head forwarding node device C2 increases the cluster hop count by 1 again, so that the cluster head forwarding node device C3 can calculate, based on the modified network setting frame, the deadline corresponding to the cluster head forwarding node device C3.

In another possible implementation, when the cluster hop count of each node device in the cluster 1 and the cluster 4 is 1, the cluster hop count of each node device in the cluster 2 is 2, and the cluster hop count of each node device in the cluster 3 is 3, an initial value of a cluster hop count in the network setting frame sent by the border router may be 0. The cluster head forwarding node device C1 first increases the cluster hop count in the network setting frame by 1, then calculates the deadline, and forwards the network setting frame to the intermediate forwarding node device Z1 and the intermediate forwarding node device Z2, and the intermediate forwarding node device Z2 forwards the network setting frame to the cluster head forwarding node device C2; and the cluster head forwarding node device C2 first increases the cluster hop count in the network setting frame by 1, then calculates the deadline, and so on.

In addition, in the foregoing two implementations, the cluster hop count of each node device in the cluster 1 and the cluster 4 may alternatively be 0, the cluster hop count of each node device in the cluster 2 may alternatively be 1, and the cluster hop count of each node device in the cluster 3 may alternatively be 2.

To understand the frame aggregation method provided in this embodiment of this application more clearly, further descriptions are provided below by using a specific embodiment with reference to FIG. 1.

A user sets a network setting parameter by using the upper-layer application: The sample period is 60 s, the deadline gradient is 0.1 s, and the sample time advance is 1 s. The upper-layer application sends the foregoing network setting parameter to the border router over the network. The border router generates the network setting frame. The network setting frame includes the following information: The network setting timestamp is 0 s, the sample period is 60 s, the deadline gradient is 0.1 s, the sample time advance is 1 s, and the cluster hop count is 1.

The sample time of each node device is 60−1=59 s, and the cluster head forwarding node device C1 and the cluster head forwarding node device C4 each obtain, based on the network setting frame through calculation, that the deadline for sending the aggregated frame is 60−0.1=59.9 s. The cluster head forwarding node device C1 modifies the cluster hop count to 2, and forwards the network setting frame to the routing forwarding node devices Z1 and Z2. The routing forwarding node device Z2 forwards the network setting frame to the cluster head forwarding node device C2. The cluster head forwarding node device C2 obtains, based on the network setting frame through calculation, that the deadline for sending the aggregated frame is 60−2×0.1=59.8 s. The cluster head forwarding node device C2 modifies the cluster hop count to 3, and forwards the network setting frame to a routing forwarding node device Z4. The routing forwarding node device Z4 forwards the network setting frame to the cluster head forwarding node device C3. The cluster head forwarding node device C3 determines, based on the network setting frame, that the deadline for sending the aggregated frame is 60−3×0.1=59.7 s.

Figure 18:
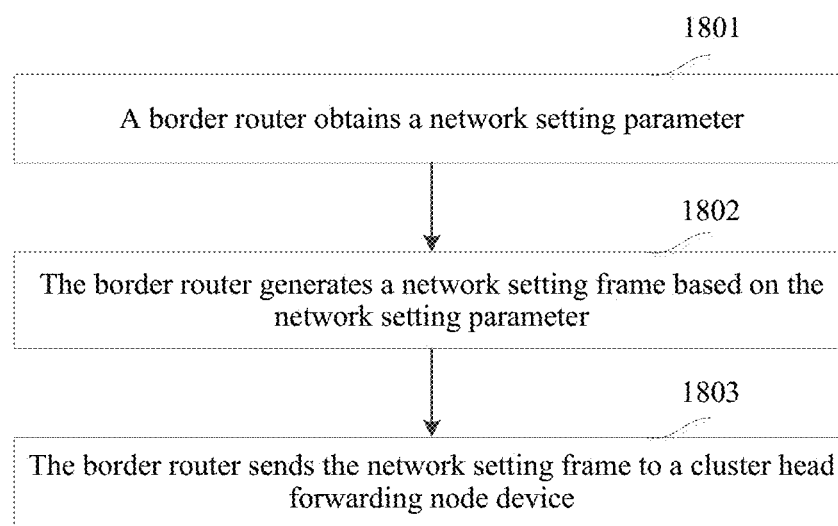
FIG. 18 is a schematic flowchart of a network setting frame sending method according to an embodiment of this application.

An embodiment of this application further provides a network setting frame sending method, to set a uniform sample period for each node device in a same network, and set, for a forwarding node device in a same network, a deadline for sending an aggregated frame. FIG. 18 is a schematic flowchart of a network setting frame sending method according to an embodiment of this application. As shown in the figure, the method may include the following steps.

Step 1801: A border router obtains a network setting parameter.

In a possible implementation, the network setting parameter obtained by the border router may be sent over a network. For example, a manager may configure the network setting parameter in an upper-layer application, and send the network setting parameter to the border router over the network.

The network setting parameter may include a sample period P that is used to instruct a node device to collect data based on the sample period and report the data.

Optionally, the network setting parameter may further include a deadline gradient $\Delta D$. Usually, for ease of management, deadline gradients in a particular Wi-SUN FAN are the same. The network architecture diagram shown in FIG. 1 is still used as an example. If a deadline for sending an aggregated frame by the cluster head forwarding node device C1 in the cluster 1 is T1, a deadline for sending the aggregated frame by the cluster head forwarding node device C2 in the cluster 2 is $T2=T1-\Delta D$, and a deadline for sending the aggregated frame by the cluster head forwarding node device C3 in the cluster 3 is $T3=T2-\Delta D$.

In a specific implementation, the manager may set the sample period and the deadline gradient in the upper-layer application, and send the sample period and the deadline gradient to the border router over the network. The manager may set different sample periods and different deadline gradients based on different application scenarios. For example, a sample period of a smart meter may be set to one month, to facilitate statistics collection of electricity consumption and electricity of a user. For another example, a sample period of an environment monitoring device may be set to one hour, to facilitate monitoring of an environment status.

Further, the network setting parameter may further include a sample time advance that is used to indicate a sample time of the node device in a sample period. For example, if the sample period is 60 s, and the sample time advance is 1 s, it indicates that each node device collects data at a $(60-1)^{th}$ s in each period and reports the data.

Step 1802: The border router generates a network setting frame based on the network setting parameter.

Specifically, the network setting frame includes a network setting timestamp $t_c$, a cluster hop count i, and the sample period. Meanings of the network setting timestamp $t_c$ and the cluster hop count are similar to those in the foregoing method.

As described above, the network setting parameter may further include the deadline gradient $\Delta D$ and/or the sample time advance. Correspondingly, the network setting frame generated by the border router may further include the deadline gradient $\Delta D$ and/or the sample time advance.

Step 1803: The border router sends the network setting frame to a cluster head forwarding node device.

The border router may be connected to one or more cluster head forwarding node devices. Correspondingly, the border router may send the network setting frame to the cluster head forwarding node device connected to the border router, and the cluster head forwarding node device further sends the network setting frame to a leaf node device, an intermediate forwarding node device, or a cluster head forwarding node device in another cluster that is connected to the cluster head forwarding node device, to send the network setting frame to each node device in the Wi-SUN FAN.

In a possible implementation, an initial cluster hop count set by the border router is 1, and the border router sends the network setting frame to the cluster head forwarding node device C1 and the cluster head forwarding node device C4 in the cluster 4 shown in FIG. 1. The cluster head forwarding node device C1 modifies the cluster hop count in the network setting frame to 2, and forwards the network setting frame to the intermediate forwarding node device Z1 and the intermediate forwarding node device Z2. The intermediate forwarding node device Z1 forwards the network setting frame to the leaf node device Y1 and the leaf node device Y2. The intermediate forwarding node device Z2 sends the network setting frame to the cluster head forwarding node device C2. The cluster head forwarding node device C2 modifies the cluster hop count in the network setting frame to 3, and forwards the network setting frame to the intermediate forwarding node device Z3, the intermediate forwarding node device Z4, and the leaf node device Y4. The intermediate forwarding node device Z4 sends the network setting frame to the cluster head forwarding node device C3.

In another possible implementation, an initial cluster hop count set by the border router is 0, and the border router sends the network setting frame to the cluster head forwarding node device C1 and the cluster head forwarding node device C4 in the cluster 4 shown in FIG. 1. The cluster head forwarding node device C1 increases the cluster hop count by 1, and forwards the modified network setting frame to the intermediate forwarding node device Z1 and the intermediate forwarding node device Z2. The intermediate forwarding node device Z1 forwards the network setting frame to the leaf node device Y1 and the leaf node device Y2, and the intermediate forwarding node device Z2 sends the network setting frame to the cluster head forwarding node device C2. The cluster head forwarding node device C2 increases the cluster hop count by 1, and forwards the modified network setting frame to the intermediate forwarding node device Z3, the intermediate forwarding node device Z4, and the leaf node device Y4. The intermediate forwarding node device Z4 sends the network setting frame to the cluster head forwarding node device C3. The cluster head forwarding node device C3 increases the cluster hop count by 1, and forwards the modified network setting frame to an intermediate forwarding node device Z5 and a leaf node device Y7.

In a possible implementation, when generating the network setting frame, the border router may add a version number to the network setting frame, to facilitate each node to determine the updated network setting frame. For example, each time the border router receives a new network setting parameter, the border router regenerates a network setting frame based on the new network setting parameter, and increases a version number in the network setting frame by 1. Each node determines a sample period, a deadline for sending an aggregated frame, and the like based on a network setting frame with a largest version number; or each node may delete a network setting frame with a relatively small version number, and only a network setting frame with the largest version number is retained. For another example, the border router may also generate a version number based on a time at which the border router generates the network setting frame, and each node determines a network setting frame that is lately generated as a network setting frame with the latest version.

Specifically, a format of the network setting frame may be shown in FIG. 14 to FIG. 17.

Based on a same technical concept, an embodiment of this application further provides a first forwarding node device, to implement the foregoing embodiment of the frame aggregation method. The first forwarding node device may be applied to a Wi-SUN FAN, and the Wi-SUN FAN includes the first forwarding node device, a first node device, and a second node device.

Figure 19:
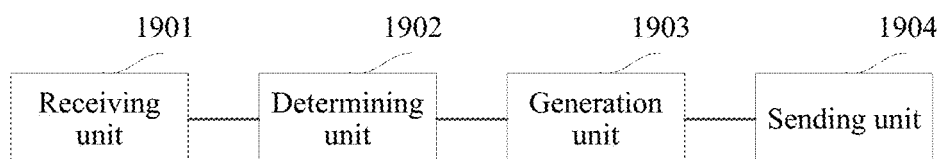
FIG. 19 is a first schematic structural diagram of a first forwarding node device according to an embodiment of this application.

Referring to FIG. 19, the first forwarding node device may include a receiving unit 1901, a determining unit 1902, a generation unit 1903, and a sending unit 1904.

Specifically, the receiving unit 1901 is configured to receive a first data frame sent by the first node device and a second data frame sent by the second node device, where the first data frame includes a first MAC header and a first MSDU, and the second data frame includes a second MAC header and a second MSDU.

The determining unit 1902 is configured to determine whether a destination MAC address in the first MAC header is the same as a destination MAC address in the second MAC header.

When the determining unit 1902 determines that the destination MAC address in the first MAC header is the same as the destination MAC address in the second MAC header, the generation unit 1903 is configured to generate a first aggregated frame based on the first data frame and the second data frame, where the first aggregated frame includes a first aggregated MAC header and a first aggregated MSDU, a destination MAC address in the first aggregated MAC header is the same as the destination MAC address in the first MAC header or the destination MAC address in the second MAC header, the first aggregated MSDU includes a first sub-MSDU and a second sub-MSDU, the first sub-MSDU includes the first MSDU and a source MAC address in the first MAC header, and the second sub-MSDU includes the second MSDU and a source MAC address in the second MAC header.

The sending unit 1904 is configured to send the first aggregated frame to a second forwarding node device.

In a possible implementation, the first node device is a leaf node device or an intermediate forwarding node device, the second node device is a leaf node device or an intermediate forwarding node device, the first node device, the second node device, and the first forwarding node device belong to a first cluster, and the Wi-SUN FAN includes the first cluster.

When the first node device is the intermediate forwarding node device, the first data frame is a data frame or an aggregated frame.

When the second node device is the intermediate forwarding node device, the second data frame is a data frame or an aggregated frame.

In a possible implementation, the first node device is a cluster head forwarding node device, the first data frame is an aggregated frame, the second node device and the first forwarding node device belong to a first cluster, the first node device belongs to a second cluster, the Wi-SUN FAN includes the first cluster and the second cluster, and the first cluster and the second cluster are not a same cluster.

In a possible implementation, the first forwarding node device is an intermediate forwarding node device, the second forwarding node device is a cluster head forwarding node device or an intermediate forwarding node device, the first forwarding node device and the second forwarding node device are in a same cluster, and the Wi-SUN FAN includes the second forwarding node device.

In a possible implementation, the first forwarding node device is a cluster head forwarding node device, the second forwarding node device is an intermediate forwarding node device or a cluster head forwarding node device, the first forwarding node device and the second forwarding node device are in different clusters, and the Wi-SUN FAN includes the second forwarding node device.

In a possible implementation, the first forwarding node device is a cluster head forwarding node device, the second forwarding node device is a border router, and the border router is located outside the Wi-SUN FAN.

In a possible implementation, the first forwarding node device is a cluster head forwarding node device, and the receiving unit 1901 is further configured to receive a network setting frame from a border router, where the network setting frame is used to indicate a time at which the first forwarding node device reports the first aggregated frame and a time at which each of the first node device and the second node device collects data.

The determining unit 1902 is further configured to determine, based on the network setting frame, a deadline for reporting the first aggregated frame.

The sending unit 1904 is specifically configured to send the first aggregated frame to the second forwarding node device based on the deadline.

In a possible implementation, the network setting frame includes a network setting timestamp, a cluster hop count, and a sample period, the network setting timestamp is used to determine a reference time of the sample period, the cluster hop count represents a hop count to a cluster in which a destination node device is located from the border router that sends the network setting frame, and the sample period is used to instruct the first node device and the second node device to collect data based on the sample period.

When determining, based on the network setting frame, the deadline for reporting the first aggregated frame, the determining unit 1902 is configured to: obtain a first time based on the network setting timestamp and the sample period; remove deadline gradients whose quantity is the cluster hop count from the first time, to obtain the deadline, where the deadline gradient is used to indicate a time required by the first forwarding node device to send the first aggregated frame to a forwarding node device outside the cluster in which the first forwarding node device is located; and increase the cluster hop count in the network setting frame by 1.

In a possible implementation, both the first sub-MSDU and the second sub-MSDU include a length field, and the length field is used to indicate a length of a sub-MSDU.

Based on a same technical concept, an embodiment of this application further provides a first forwarding node device, to implement the foregoing embodiment of the frame aggregation method. The first forwarding node device may be applied to a Wi-SUN FAN, and the Wi-SUN FAN includes the first forwarding node device, a first node device, and a second node device.

Figure 20:
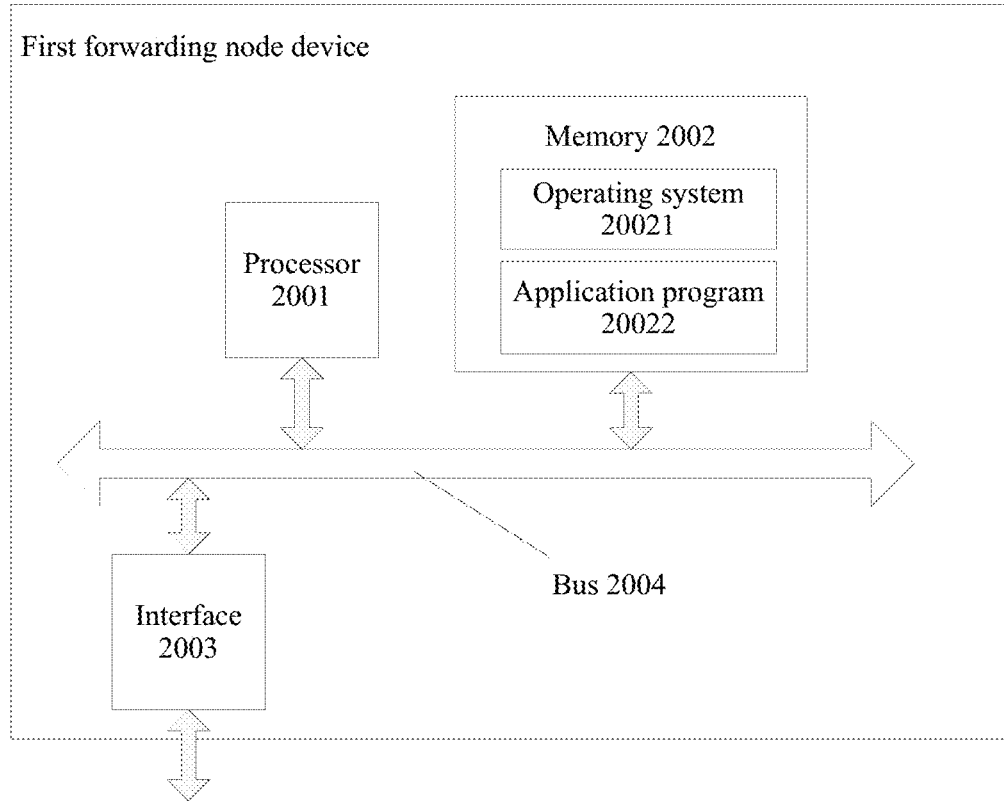
FIG. 20 is a second schematic structural diagram of a first forwarding node device according to an embodiment of this application.

FIG. 20 is a schematic structural diagram of hardware of a first forwarding node device according to an embodiment of this application. The first forwarding node device may include a processor 2001, a memory 2002, an interface 2003, and a bus 2004. The interface 2003 may be implemented in a wireless or wired manner, and may be a network adapter. The processor 2001, the memory 2002, and the interface 2003 are connected by using the bus 2004.

The interface 2003 may specifically include a transmitter and a receiver, and may be configured to receive and send information between the first forwarding node device and each of the first node device, the second node device, and a second forwarding node device. For example, the interface 2003 is configured to support steps 501 and 503 in FIG. 5. The processor 2001 is configured to perform processing that is performed by the first forwarding node device in the foregoing embodiments. For example, the processor 2001 is configured to support step 502 in FIG. 5. The memory 2002 includes an operating system 20021 and an application program 20022, and is configured to store a program, code, or instructions. When executing the program, the code, or the instructions, the processor or a hardware device may complete a processing process related to the first forwarding node device in one or more of the method embodiments. Optionally, the memory 2002 may include a read-only memory (ROM) and a random access memory (RAM). The ROM includes a basic input/output system (BIOS) or an embedded system, and the RAM includes an application program and an operating system. When the first forwarding node device needs to run, the BIOS built into the ROM or a bootloader in the embedded system is used to boot a system to start, and boot the first forwarding node device to enter a normal running state. After entering the normal running state, the first forwarding node device runs the application program and the operating system in the RAM, to complete a processing process related to the first forwarding node device in the method embodiments.

It may be understood that FIG. 20 shows only a simplified design of the first forwarding node device. In actual application, the first forwarding node device may include any quantity of interfaces, processors, or memories.

Figure 21:
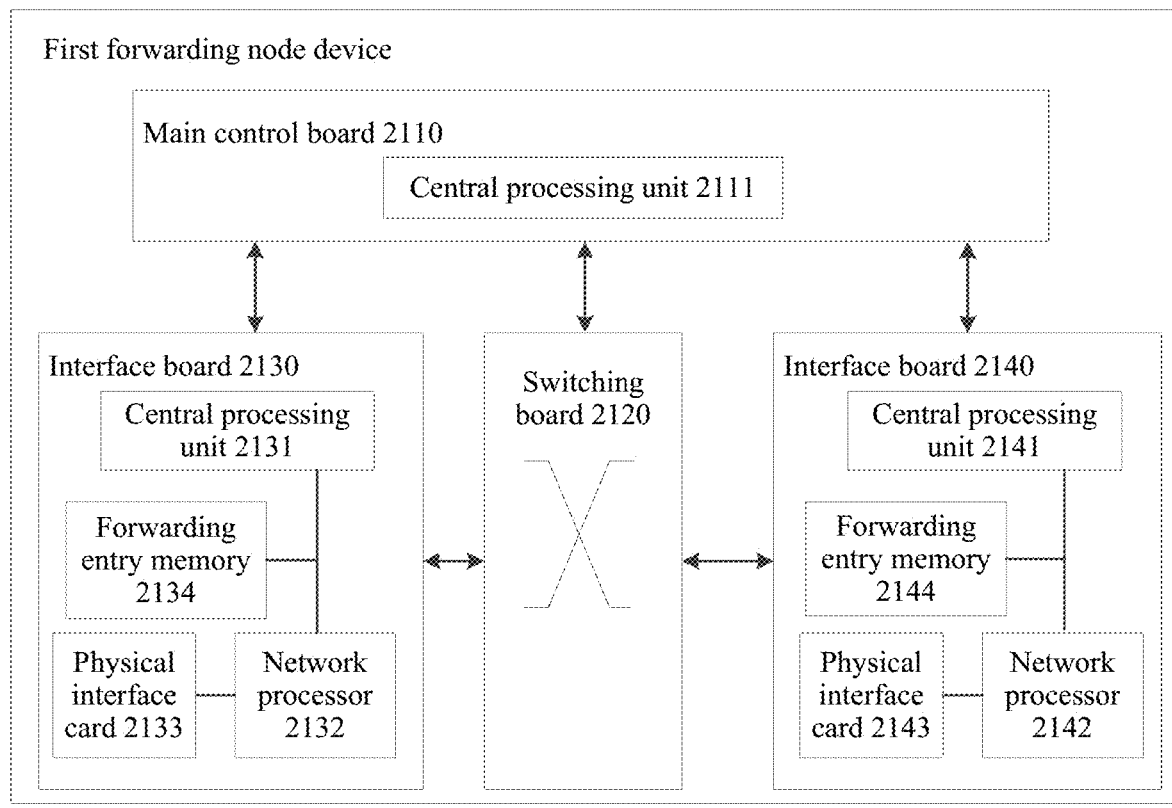
FIG. 21 is a third schematic structural diagram of a first forwarding node device according to an embodiment of this application.

FIG. 21 is a schematic structural diagram of hardware of another first forwarding node device according to an embodiment of this application. The first forwarding node device shown in FIG. 21 may perform corresponding steps that are performed by the first forwarding node device in the foregoing embodiment of the frame aggregation method.

As shown in FIG. 21, the first forwarding node device includes a main control board 2110, an interface board 2130, a switching board 2120, and an interface board 2140. The main control board 2110, the interface board 2130, the interface board 2140, and the switching board 2120 are connected to a platform backboard by using a system bus for interworking. The main control board 2110 is configured to complete functions such as system management, device maintenance, and protocol processing. The switching board 2120 is configured to complete data exchange between interface boards (the interface board is also referred to as a line card or a service board). The interface board 2130 and the interface board 2140 are configured to provide various service interfaces, and forward a data packet.

The interface board 2130 may include a central processing unit 2131, a forwarding entry memory 2134, a physical interface card 2133, and a network processor 2132. The central processing unit 2131 is configured to control and manage the interface board, and communicate with a central processing unit 2111 on the main control board 2110. The forwarding entry memory 2134 is configured to store a forwarding entry. The physical interface card 2133 is configured to receive and send a data frame. The network processor 2132 is configured to control, based on the forwarding entry, the physical interface card 2133 to receive and send a data frame.

Specifically, the physical interface card 2133 receives a first data frame and a second data frame, and sends the first data frame and the second data frame to the central processing unit 2111 on the main control board 2110 by using the central processing unit 2131. The central processing unit 2111 is configured to obtain the first data frame and the second data frame, and generate a first aggregated frame. The physical interface card 2133 is further configured to send the first aggregated frame to the second forwarding node device.

The central processing unit 2131 is further configured to control the network processor 2132 to obtain the forwarding entry in the forwarding entry memory 2134. In addition, the central processing unit 2131 is further configured to control the network processor 2132 to receive and send a data frame by using the physical interface card 2133.

It should be understood that an operation on the interface board 2140 is consistent with an operation on the interface board 2130 in this embodiment of the present application. For brevity, details are not described. It should be understood that the first forwarding node device in this embodiment may correspond to functions and/or steps implemented in the foregoing embodiments of the frame aggregation method.

In addition, it should be noted that there may be one or more main control boards. When there are a plurality of main control boards, a primary main control board and a secondary main control board may be included. There may be one or more interface boards, and the first forwarding node device with a stronger data processing capability provides more interface boards. There may be one or more physical interface cards on the interface board. There may be no switching board, or there may be one or more switching boards. When there are a plurality of switching boards, load sharing and redundancy backup may be jointly implemented by the plurality of switching boards. In a centralized forwarding architecture, the first forwarding node device may not need a switching board, and the interface board is responsible for a service data processing function of an entire system. In a distributed forwarding architecture, the first forwarding node device may have at least one switching board, and data exchange between a plurality of interface boards is implemented by using the switching board, to provide a large-capacity data exchange and processing capability. Therefore, a data access and processing capability of the first forwarding node device in the distributed architecture is better than that of a device in the centralized architecture. A specific architecture to be used depends on a specific networking deployment scenario. This is not limited herein.

Figure 22:
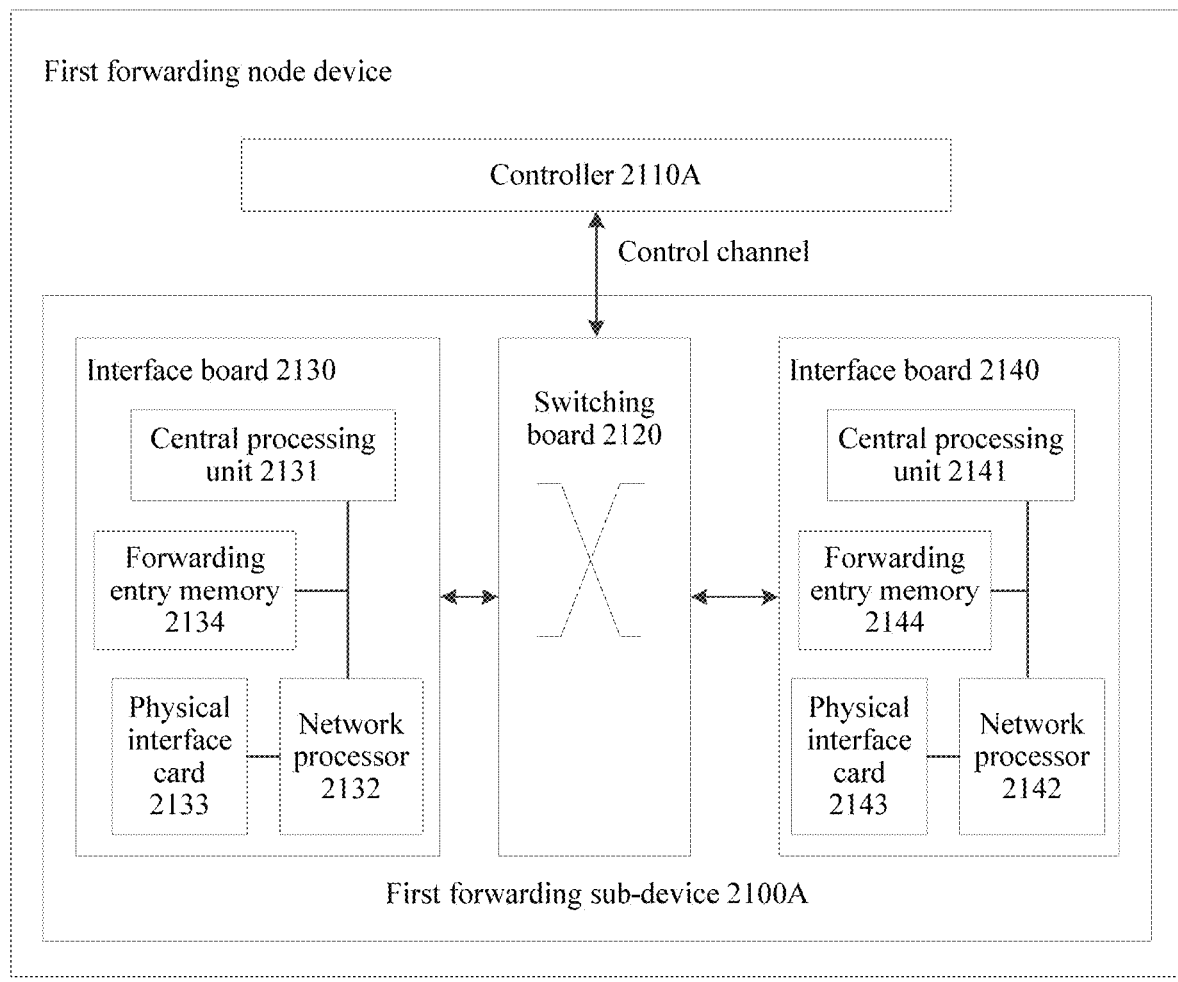
FIG. 22 is a fourth schematic structural diagram of a first forwarding node device according to an embodiment of this application.

FIG. 22 is a schematic structural diagram of hardware of still another first forwarding node device according to an embodiment of this application. The first forwarding node device shown in FIG. 22 may perform corresponding steps that are performed by the first forwarding node device in the method in the foregoing embodiment.

Such a product form of the first forwarding node device is applicable to a network architecture (for example, software-defined network (SDN)) in which control and forwarding are separated. In the SDN, the main control board 2110 of the first forwarding node device shown in FIG. 21 is separated from the device, and forms a new independent physical device (namely, a controller 2110A shown in FIG. 22), and remaining components form another independent physical device (namely, a first forwarding sub-device 2100A shown in FIG. 22). The controller 2110A interacts with the first forwarding sub-device 2100A by using a control channel protocol. The control channel protocol may be an open flow protocol, a path computation element communication protocol (PCEP), a border gateway protocol (BGP), an interface to the routing system (I2RS), or the like. In other words, compared with the foregoing embodiment corresponding to FIG. 21, the first forwarding node device in this embodiment includes the separated controller 2110A and the first forwarding sub-device 2100A.

The controller 2110A may be implemented based on a general-purpose physical server or a special-purpose hardware structure. In an example, the controller includes a receiver, a processor, a transmitter, a RAM, a ROM, and a bus (not shown). The processor is coupled to the receiver, the transmitter, the RAM, and the ROM by using the bus. When the controller needs to run, a BIOS built into the ROM or a bootloader in an embedded system is used to boot a system to start, and boot the controller to enter a normal running state. After entering the normal running state, the controller runs an application program and an operating system in the RAM, so that the processor performs all functions and steps of the main control board 2110 in FIG. 21.

The first forwarding sub-device 2100A may be implemented based on a special-purpose hardware structure. A function and a structure of the first forwarding sub-device 2100A is consistent with functions and structures of the interface board 2130, the interface board 2140, and the switching board 2120 in FIG. 21, to perform corresponding functions and steps. Alternatively, the first forwarding sub-device 2100A may be a virtual first forwarding sub-device implemented based on the general-purpose physical server and a network functions virtualization (NFV) technology, and the virtual first forwarding sub-device is a virtual router. In a scenario of the virtual first forwarding sub-device, the interface board, the switching board, and the processor that are included in the foregoing physical first forwarding sub-device in the embodiment of the first forwarding sub-device may be considered as an interface resource, a network resource, and a processing resource that are allocated by the first forwarding sub-device to the virtual first forwarding sub-device by using the general-purpose physical server in a virtual environment. For a specific implementation of implementing functions or steps of the first forwarding sub-device by using the general-purpose physical server, or implementing functions or steps of the first forwarding sub-device by using the general-purpose physical server and the NFV technology, refer to the embodiment in FIG. 20.

It should be understood that in this embodiment, the controller 2110A and the first forwarding sub-device 2100A in the first forwarding node device may implement various functions and steps implemented by the first forwarding node device in the method embodiment.

Figure 23:
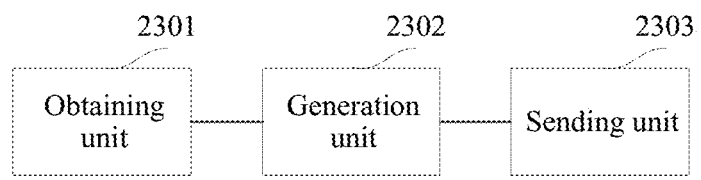
FIG. 23 is a first schematic structural diagram of a border router according to an embodiment of this application.

Based on a same technical concept, an embodiment of this application further provides a border router, to implement the foregoing embodiment of the network setting frame sending method. Referring to FIG. 23, the border router provided in this embodiment of this application may include an obtaining unit 2301, a generation unit 2302, and a sending unit 2303.

Specifically, the obtaining unit 2301 is configured to obtain a network setting parameter, where the network setting parameter includes a sample period, and the sample period is used to instruct a node device to collect data based on the sample period.

The generation unit 2302 is configured to generate a network setting frame based on the network setting parameter, where the network setting frame includes a network setting timestamp, a cluster hop count, and the sample period, the network setting timestamp is used to determine a reference time of the sample period, and the cluster hop count represents a hop count to a cluster in which a destination node device is located from the border router that sends the network setting frame.

The sending unit 2303 is configured to send the network setting frame to a cluster head forwarding node device, where the cluster head forwarding node device is located in a first cluster in a Wi-SUN FAN, and the first cluster communicates with the border router by using the cluster head forwarding node device.

In a possible implementation, the network setting parameter further includes a sample time advance, and the sample time advance is used to indicate a sample time of the node device in a sample period; and the network setting frame further includes the sample time advance.

In a possible implementation, the obtaining unit 2301 is further configured to receive, by the border router, an aggregated frame sent by the cluster head forwarding node device. The aggregated frame is obtained by aggregating a first data frame sent by a first node device and a second data frame sent by a second node device, the first node device and the second node device belong to the Wi-SUN FAN, the first data frame includes a first media access control MAC header and a first MAC service data unit MSDU, the second data frame includes a second MAC header and a second MSDU, a destination MAC address in the first MAC header is the same as a destination MAC address in the second MAC header, the aggregated frame includes a first aggregated MAC header and a first aggregated MSDU, a destination MAC address in the first aggregated MAC header is the same as the destination MAC address in the first MAC header or the destination MAC address in the second MAC header, the first aggregated MSDU includes a first sub-MSDU and a second sub-MSDU, the first sub-MSDU includes the first MSDU and a source MAC address in the first MAC header, and the second sub-MSDU includes the second MSDU and a source MAC address in the second MAC header.

Based on a same technical concept, an embodiment of this application further provides a border router, to implement the foregoing embodiment of the network setting frame sending method.

Figure 24:
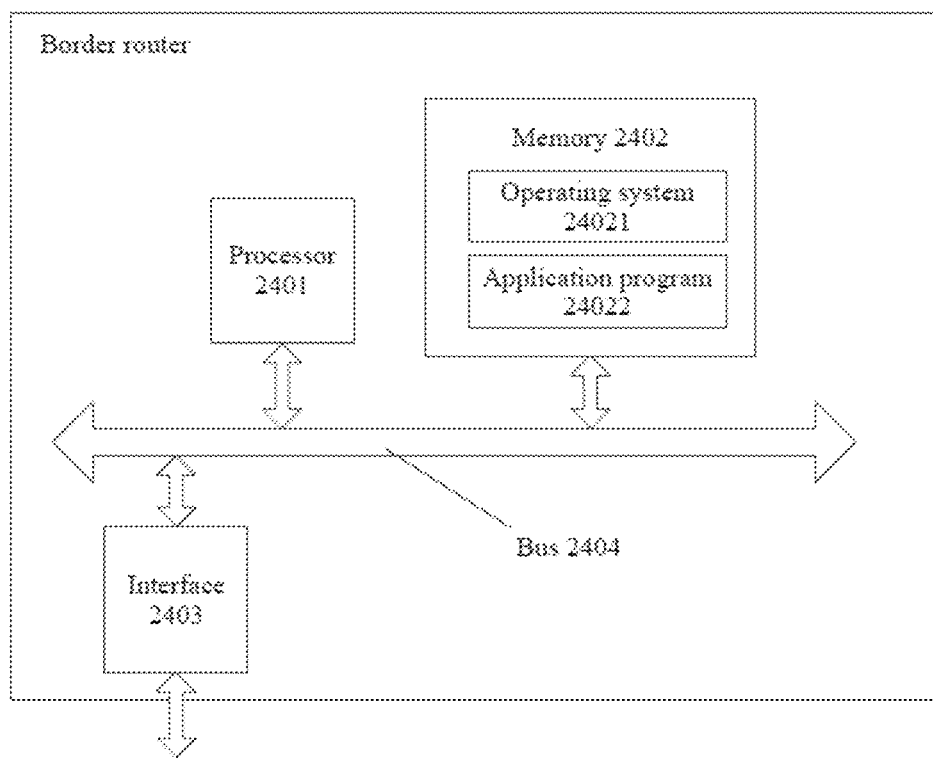
FIG. 24 is a second schematic structural diagram of a border router according to an embodiment of this application.

FIG. 24 is a schematic structural diagram of hardware of a border router according to an embodiment of this application. The border router may include a processor 2401, a memory 2402, an interface 2403, and a bus 2404. The interface 2403 may be implemented in a wireless or wired manner, and may be specifically a network adapter. The processor 2401, the memory 2402, and the interface 2403 are connected by using the bus 2404.

The interface 2403 may specifically include a transmitter and a receiver, and may be configured to receive and send information between the border router and the cluster head forwarding node device in the foregoing embodiment. The processor 2401 is configured to perform processing that is performed by the border router in the foregoing embodiment. The memory 2402 includes an operating system 24021 and an application program 24022, and is configured to store a program, code, or an instruction. When executing the program, the code, or the instruction, the processor or a hardware device may complete a processing process related to the border router in the method embodiment. Optionally, the memory 2402 may include a ROM and a RAM. The ROM includes a BIOS or an embedded system, and the RAM includes an application program and an operating system. When the border router needs to run, the BIOS built into the ROM or a bootloader in the embedded system is used to boot a system to start, and boot the border router to enter a normal running state. After entering the normal running state, the border router runs the application program and the operating system in the RAM, to complete a processing process related to the border router in the method embodiment.

It may be understood that FIG. 24 shows only a simplified design of the border router. In actual application, the border router may include any quantity of interfaces, processors, or memories.

Figure 25:
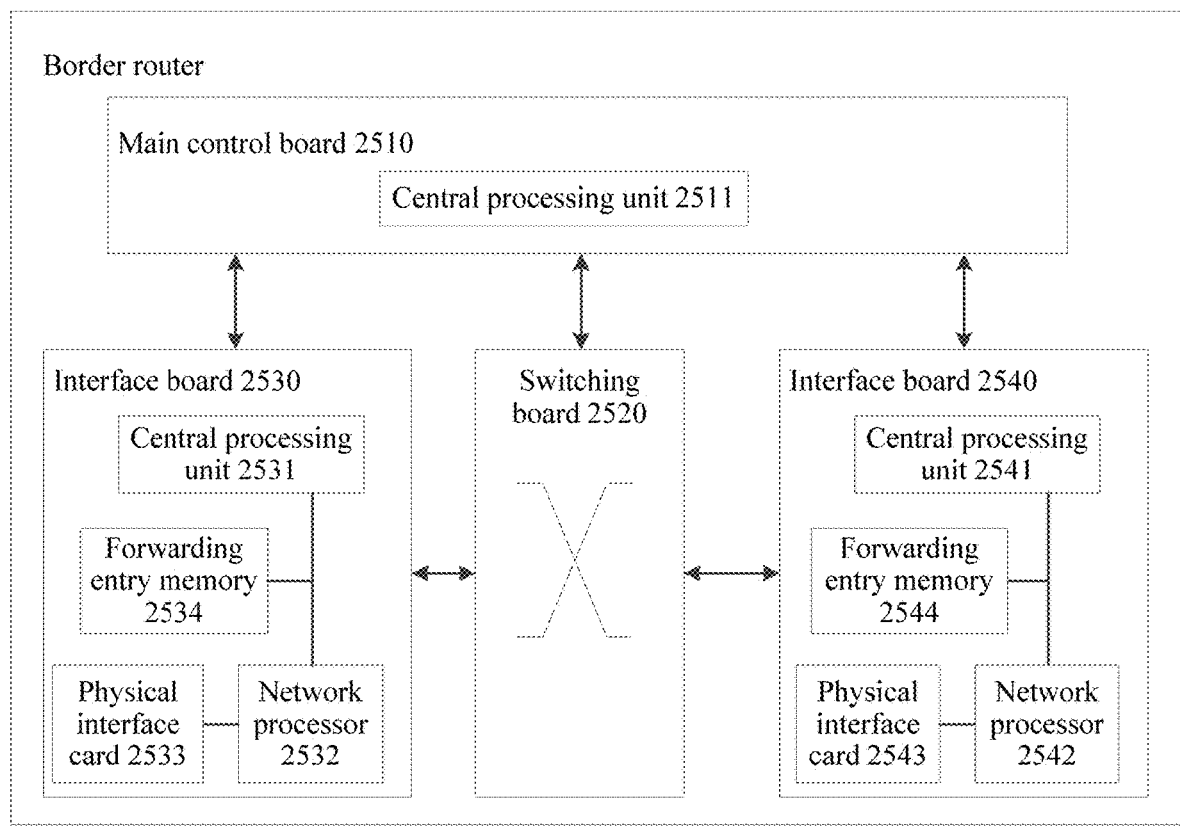
FIG. 25 is a third schematic structural diagram of a border router according to an embodiment of this application.

FIG. 25 is a schematic structural diagram of hardware of another border router according to an embodiment of this application. The border router shown in FIG. 25 may perform corresponding steps that are performed by the border router in the foregoing embodiment of the network setting frame sending method.

As shown in FIG. 25, the border router includes a main control board 2510, an interface board 2530, a switching board 2520, and an interface board 2540. The main control board 2510, the interface board 2530, the interface board 2540, and the switching board 2520 are connected to a platform backboard by using a system bus for interworking. The main control board 2510 is configured to complete functions such as system management, device maintenance, and protocol processing. The switching board 2520 is configured to complete data exchange between interface boards (the interface board is also referred to as a line card or a service board). The interface board 2530 and the interface board 2540 are configured to provide various service interfaces, and forward a data packet.

The interface board 2530 may include a central processing unit 2531, a forwarding entry memory 2534, a physical interface card 2533, and a network processor 2532. The central processing unit 2531 is configured to control and manage the interface board, and communicate with a central processing unit 2511 on the main control board 2510. The forwarding entry memory 2534 is configured to store a forwarding entry. The physical interface card 2533 is configured to send a network setting frame, and receive an aggregated frame. The network processor 2532 is configured to control, based on the forwarding entry, the physical interface card 2133 to receive and send the network setting frame or the aggregated frame.

Specifically, the physical interface card 2533 may receive a network setting parameter from an upper-layer application, and send the network setting parameter to the central processing unit 2511 on the main control board 2510 by using the central processing unit 2531. The central processing unit 2511 is configured to obtain the network setting parameter and generate the network setting frame. The physical interface card 2533 is further configured to send the network setting frame to the cluster head forwarding node device.

The central processing unit 2531 is further configured to control the network processor 2532 to obtain the forwarding entry in the forwarding entry memory 2534. In addition, the central processing unit 2531 is further configured to control the network processor 2532 to receive and send a data frame by using the physical interface card 2533.

It should be understood that an operation on the interface board 2540 is consistent with an operation on the interface board 2530 in this embodiment of the present application. It should be understood that the border router in this embodiment may correspond to functions and/or steps implemented in one or more of the foregoing embodiments of the network setting frame sending method.

In addition, it should be noted that there may be one or more main control boards. When there are a plurality of main control boards, a primary main control board and a secondary main control board may be included. There may be one or more interface boards, and the border router with a stronger data processing capability provides more interface boards. There may be one or more physical interface cards on the interface board. There may be no switching board, or there may be one or more switching boards. When there are a plurality of switching boards, load sharing and redundancy backup may be jointly implemented by the plurality of switching boards. In a centralized forwarding architecture, the border router may not need a switching board, and the interface board is responsible for a service data processing function of an entire system. In a distributed forwarding architecture, the border router may have at least one switching board, and data exchange between a plurality of interface boards is implemented by using the switching board, to provide a large-capacity data exchange and processing capability. Therefore, a data access and processing capability of the border router in the distributed architecture is better than that of a device in the centralized architecture. A specific architecture to be used depends on a specific networking deployment scenario.

Figure 26:
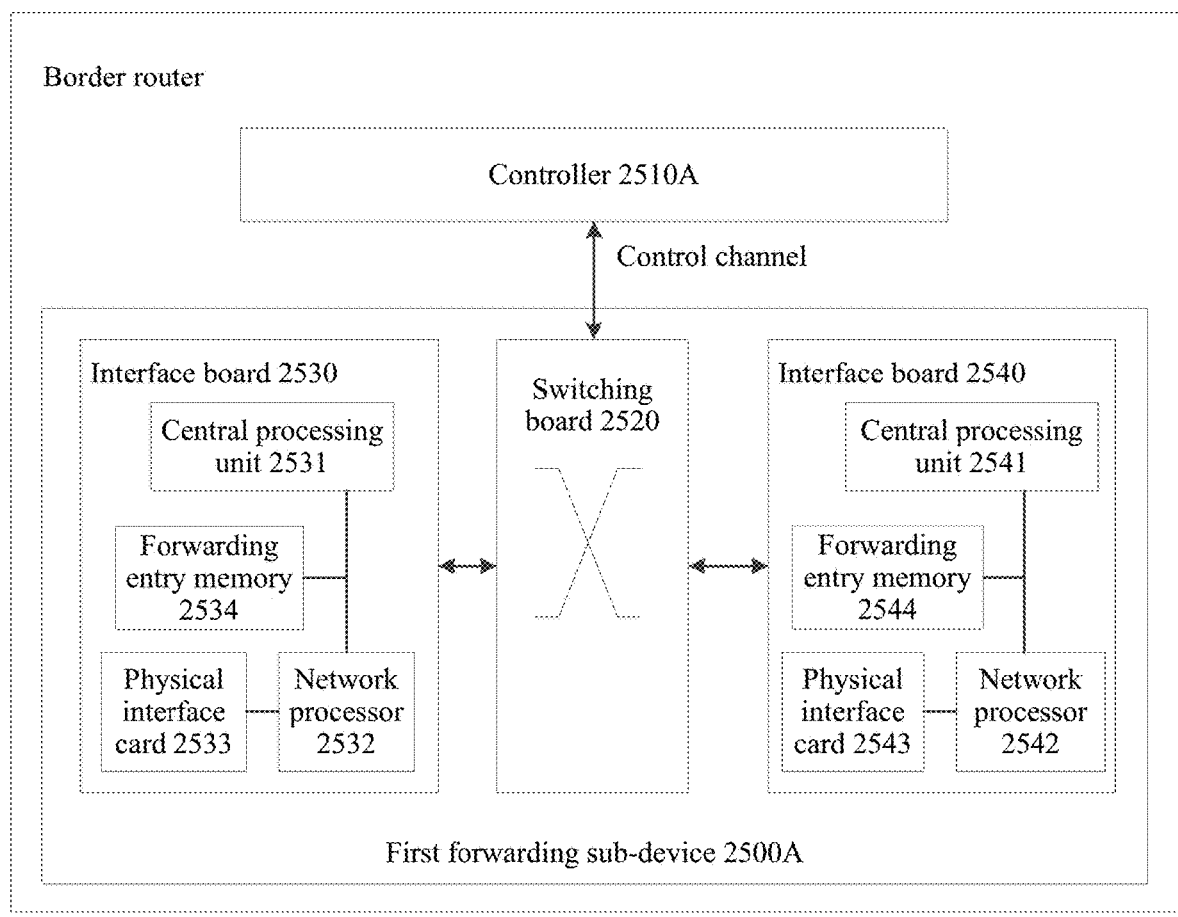
FIG. 26 is a fourth schematic structural diagram of a border router according to an embodiment of this application.

FIG. 26 is a schematic structural diagram of hardware of still another border router according to an embodiment of this application. The border router shown in FIG. 26 may perform corresponding steps that are performed by the border router in the method in the foregoing embodiment.

Such a product form of the border router is applicable to a network architecture (for example, software-defined network (SDN)) in which control and forwarding are separated. In the SDN, the main control board 2510 of the border router shown in FIG. 25 is separated from the device, and forms a new independent physical device (namely, a controller 2510A shown in FIG. 26), and remaining components form another independent physical device (namely, a first forwarding sub-device 2500A shown in FIG. 26). The controller 2510A interacts with the first forwarding sub-device 2500A by using a control channel protocol. The control channel protocol may be an open flow protocol, a PCEP, a BGP, an I2RS, or the like. In other words, compared with the foregoing embodiment corresponding to FIG. 25, the border router in this embodiment includes the separated controller 2510A and the first forwarding sub-device 2500A.

The controller 2510A may be implemented based on a general-purpose physical server or a special-purpose hardware structure. In an example, the controller includes a receiver, a processor, a transmitter, a RAM, a ROM, and a bus (not shown). The processor is coupled to the receiver, the transmitter, the RAM, and the ROM by using the bus. When the controller needs to run, a BIOS built into the ROM or a bootloader in an embedded system is used to boot a system to start, and boot the controller to enter a normal running state. After entering the normal running state, the controller runs an application program and an operating system in the RAM, so that the processor performs all functions and steps of the main control board 2510 in FIG. 25.

The first forwarding sub-device 2500A may be implemented based on a special-purpose hardware structure. A function and a structure of the first forwarding sub-device 2500A is consistent with functions and structures of the interface board 2530, the interface board 2540, and the switching board 2520 in FIG. 25, to perform corresponding functions and steps. Alternatively, the first forwarding sub-device 2500A may be a virtual first forwarding sub-device implemented based on the general-purpose physical server and a network function virtualization (NFV) technology, and the virtual first forwarding sub-device is a virtual router. In a scenario of the virtual first forwarding sub-device, the interface board, the switching board, and the processor that are included in the foregoing first forwarding sub-device in the embodiment of the physical border router may be considered as an interface resource, a network resource, and a processing resource that are allocated by the first forwarding sub-device to the virtual first forwarding sub-device by using the general-purpose physical server in a virtual environment. For a specific implementation of implementing functions or steps of the first forwarding sub-device by using the general-purpose physical server, or implementing functions or steps of the first forwarding sub-device by using the general-purpose physical server and the NFV technology, refer to the embodiment in FIG. 24.

It should be understood that, in this embodiment, the controller 2510A and the first forwarding sub-device 2500A in the border router may implement various functions and steps implemented by the border router in the method embodiment. For brevity, details are not described herein again.

Based on a same technical concept, an embodiment of this application further provides a Wi-SUN FAN. The Wi-SUN FAN includes at least one first forwarding node device. The first forwarding node device may be the first forwarding node device in any one of the foregoing embodiments.

Based on a same technical concept, an embodiment of this application further provides a computer-readable storage medium. The computer-readable storage medium stores a computer instruction, and when the instruction is run on a computer, the computer is enabled to perform any one of the embodiments of the frame aggregation method and the network setting frame sending method.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

A person skilled in the art may make various modifications and variations to embodiments described in this application without departing from the spirit and scope of this application. In this way, this application is intended to cover these modifications and variations of this application provided that they fall within the scope of protection defined by the claims of this application and their equivalent technologies.

What is claimed is:

1. A frame aggregation method applied to a wireless smart ubiquitous network (Wi-SUN) field area network (FAN) comprising a first forwarding node device, a first node device, and a second node device, and the method comprises:
receiving, by the first forwarding node device, a first data frame sent by the first node device and a second data frame sent by the second node device, wherein the first data frame comprises a first media access control (MAC) header and a first MAC service data unit (MSDU), and the second data frame comprises a second MAC header and a second MSDU;
determining, by the first forwarding node device, that a destination MAC address in the first MAC header is the same as a destination MAC address in the second MAC header;
generating, by the first forwarding node device, a first aggregated frame based on the first data frame and the second data frame, wherein the first aggregated frame comprises a first aggregated MAC header and a first aggregated MSDU, a destination MAC address in the first aggregated MAC header is the same as the destination MAC address in the first MAC header or the destination MAC address in the second MAC header, the first aggregated MSDU comprises a first sub-MSDU and a second sub-MSDU, the first sub-MSDU comprises the first MSDU and a source MAC address in the first MAC header, and the second sub-MSDU comprises the second MSDU and a source MAC address in the second MAC header; and
sending, by the first forwarding node device, the first aggregated frame to a second forwarding node device,
wherein the first node device is a leaf node device or an intermediate forwarding node device and the second node device is a leaf node device or an intermediate forwarding node device, wherein the first node device, the second node device, and the first forwarding node device are in a first cluster in the Wi-SUN FAN, when the first node device is the intermediate forwarding node device, the first data frame is a data frame or an aggregated frame, and when the second node device is the intermediate forwarding node device, the second data frame is a data frame or an aggregated frame.

2. The method according to claim 1, wherein the first sub-MSDU and the second sub-MSDU each comprises a length field indicating a length of a sub-MSDU.

3. A frame aggregation method applied to a wireless smart ubiquitous network (Wi-SUN) field area network (FAN) comprising a first forwarding node device, a first node device, and a second node device, and the method comprises:
receiving, by the first forwarding node device, a first data frame sent by the first node device and a second data frame sent by the second node device, wherein the first data frame comprises a first media access control (MAC) header and a first MAC service data unit (MSDU), and the second data frame comprises a second MAC header and a second MSDU;
determining, by the first forwarding node device, that a destination MAC address in the first MAC header is the same as a destination MAC address in the second MAC header;
generating, by the first forwarding node device, a first aggregated frame based on the first data frame and the second data frame, wherein the first aggregated frame comprises a first aggregated MAC header and a first aggregated MSDU, a destination MAC address in the first aggregated MAC header is the same as the destination MAC address in the first MAC header or the destination MAC address in the second MAC header, the first aggregated MSDU comprises a first sub-MSDU and a second sub-MSDU, the first sub-MSDU comprises the first MSDU and a source MAC address in the first MAC header, and the second sub-MSDU comprises the second MSDU and a source MAC address in the second MAC header; and
sending, by the first forwarding node device, the first aggregated frame to a second forwarding node device,
wherein the first node device is a cluster head forwarding node device, the first data frame is an aggregated frame, the second node device and the first forwarding node device are in a first cluster in the Wi-SUN FAN, the first node device is in a second cluster in the Wi-SUN FAN, and the first cluster and the second cluster are not a same cluster.

4. A frame aggregation method applied to a wireless smart ubiquitous network (Wi-SUN) field area network (FAN) comprising a first forwarding node device, a first node device, and a second node device, and the method comprises:
receiving, by the first forwarding node device, a first data frame sent by the first node device and a second data frame sent by the second node device, wherein the first data frame comprises a first media access control (MAC) header and a first MAC service data unit (MSDU), and the second data frame comprises a second MAC header and a second MSDU;
determining, by the first forwarding node device, that a destination MAC address in the first MAC header is the same as a destination MAC address in the second MAC header;
generating, by the first forwarding node device, a first aggregated frame based on the first data frame and the second data frame, wherein the first aggregated frame comprises a first aggregated MAC header and a first aggregated MSDU, a destination MAC address in the first aggregated MAC header is the same as the destination MAC address in the first MAC header or the destination MAC address in the second MAC header, the first aggregated MSDU comprises a first sub- MSDU and a second sub-MSDU, the first sub-MSDU comprises the first MSDU and a source MAC address in the first MAC header, and the second sub-MSDU comprises the second MSDU and a source MAC address in the second MAC header; and sending, by the first forwarding node device, the first aggregated frame to a second forwarding node device, wherein the first forwarding node device is a cluster head forwarding node device, and the method further comprises:

receiving, by the first forwarding node device, a network setting frame from a border router, wherein the network setting frame indicates a time at which the first forwarding node device reports the first aggregated frame and a time at which each of the first node device and the second node device collects data; and determining, by the first forwarding node device based on the network setting frame, a deadline for reporting the first aggregated frame; and the sending, by the first forwarding node device, the first aggregated frame to a second forwarding node device comprises sending, by the first forwarding node device, the first aggregated frame to the second forwarding node device based on the deadline.

5. The method according to claim 4, wherein the network setting frame comprises a network setting timestamp, a cluster hop count, and a sample period, the network setting timestamp being used to determine a reference time of the sample period, the cluster hop count representing a hop count to a cluster in which a destination node device is located from the border router that sends the network setting frame, and the sample period being used to instruct the first node device and the second node device to collect data based on the sample period; and the determining, by the first forwarding node device based on the network setting frame, a deadline for reporting the first aggregated frame comprises:

obtaining, by the first forwarding node device, a first time based on the network setting timestamp and the sample period;

removing, by the first forwarding node device from the first time, deadline gradients whose quantity is the cluster hop count, to obtain the deadline, wherein the deadline gradient is used to indicate a time required by the first forwarding node device to send the first aggregated frame to a forwarding node device outside the cluster in which the first forwarding node device is located; and increasing, by the first forwarding node device, the cluster hop count in the network setting frame by 1.

6. A first forwarding node device in a wireless smart ubiquitous network (Wi-SUN) field area network (FAN) which comprises the first forwarding node device, a first node device, and a second node device, and the first forwarding node device comprises:

a receiver, configured to receive a first data frame sent by the first node device and a second data frame sent by the second node device, wherein the first data frame comprises a first media access control (MAC) header and a first MAC service data unit (MSDU), and the second data frame comprises a second MAC header and a second MSDU;

a processor, configured to:

determine that a destination MAC address in the first MAC header is the same as a destination MAC address in the second MAC header, and generate a first aggregated frame based on the first data frame and the second data frame, wherein the first aggregated frame comprises a first aggregated MAC header and a first aggregated MSDU, a destination MAC address in the first aggregated MAC header is the same as the destination MAC address in the first MAC header or the destination MAC address in the second MAC header, the first aggregated MSDU comprises a first sub-MSDU and a second sub-MSDU, the first sub-MSDU comprises the first MSDU and a source MAC address in the first MAC header, and the second sub-MSDU comprises the second MSDU and a source MAC address in the second MAC header; and a transmitter, configured to send the first aggregated frame to a second forwarding node device, wherein the first node device is a leaf node device or an intermediate forwarding node device, and the second node device is a leaf node device or an intermediate forwarding node device, wherein the first node device, the second node device, and the first forwarding node device are in a first cluster in the Wi-SUN FAN, when the first node device is the intermediate forwarding node device, the first data frame is a data frame or an aggregated frame, and when the second node device is the intermediate forwarding node device, the second data frame is a data frame or an aggregated frame.

7. A first forwarding node device in a wireless smart ubiquitous network (Wi-SUN) field area network (FAN) which comprises the first forwarding node device, a first node device, and a second node device, and the first forwarding node device comprises:

a receiver, configured to receive a first data frame sent by the first node device and a second data frame sent by the second node device, wherein the first data frame comprises a first media access control (MAC) header and a first MAC service data unit (MSDU), and the second data frame comprises a second MAC header and a second MSDU;

a processor, configured to:

determine that a destination MAC address in the first MAC header is the same as a destination MAC address in the second MAC header, and generate a first aggregated frame based on the first data frame and the second data frame, wherein the first aggregated frame comprises a first aggregated MAC header and a first aggregated MSDU, a destination MAC address in the first aggregated MAC header is the same as the destination MAC address in the first MAC header or the destination MAC address in the second MAC header, the first aggregated MSDU comprises a first sub-MSDU and a second sub-MSDU, the first sub-MSDU comprises the first MSDU and a source MAC address in the first MAC header, and the second sub-MSDU comprises the second MSDU and a source MAC address in the second MAC header; and a transmitter, configured to send the first aggregated frame to a second forwarding node device, wherein the first forwarding node device is a cluster head forwarding node device, and the second forwarding node device is a border router located outside the Wi-SUN FAN.

8. A first forwarding node device in a wireless smart ubiquitous network (Wi-SUN) field area network (FAN) which comprises the first forwarding node device, a first node device, and a second node device, and the first forwarding node device comprises:

a receiver, configured to receive a first data frame sent by the first node device and a second data frame sent by the second node device, wherein the first data frame comprises a first media access control (MAC) header and a first MAC service data unit (MSDU), and the second data frame comprises a second MAC header and a second MSDU;

a processor, configured to:
  determine that a destination MAC address in the first MAC header is the same as a destination MAC address in the second MAC header, and
  generate a first aggregated frame based on the first data frame and the second data frame, wherein the first aggregated frame comprises a first aggregated MAC header and a first aggregated MSDU, a destination MAC address in the first aggregated MAC header is the same as the destination MAC address in the first MAC header or the destination MAC address in the second MAC header, the first aggregated MSDU comprises a first sub-MSDU and a second sub-MSDU, the first sub-MSDU comprises the first MSDU and a source MAC address in the first MAC header, and the second sub-MSDU comprises the second MSDU and a source MAC address in the second MAC header; and a transmitter, configured to send the first aggregated frame to a second forwarding node device, wherein the first forwarding node device is a cluster head forwarding node device;

the receiver is further configured to receive a network setting frame from a border router, wherein the network setting frame indicates a time at which the first forwarding node device reports the first aggregated frame and a time at which each of the first node device and the second node device collects data;

the processor is further configured to determine, based on the network setting frame, a deadline for reporting the first aggregated frame; and the transmitter is configured to send the first aggregated frame to the second forwarding node device based on the deadline.

9. The first forwarding node device according to claim 8, wherein the network setting frame comprises a network setting timestamp, a cluster hop count, and a sample period, the network setting timestamp being used to determine a reference time of the sample period, the cluster hop count representing a hop count to a cluster in which a destination node device is located from the border router that sends the network setting frame, and the sample period being used to instruct the first node device and the second node device to collect data based on the sample period; and when determining, based on the network setting frame, the deadline for reporting the first aggregated frame, the processor is configured to:

obtain a first time based on the network setting timestamp and the sample period;

remove, from the first time, deadline gradients whose quantity is the cluster hop count, to obtain the deadline, wherein the deadline gradient is used to indicate a time required by the first forwarding node device to send the first aggregated frame to a forwarding node device outside the cluster in which the first forwarding node device is located; and increase the cluster hop count in the network setting frame by 1.

* * * * *